(12) United States Patent
Takaoka et al.

(10) Patent No.: US 8,654,900 B2
(45) Date of Patent: Feb. 18, 2014

(54) WIRELESS COMMUNICATION DEVICE AND QUANTIZATION METHOD

(75) Inventors: Shinsuke Takaoka, Kanagawa (JP);
Kenichi Miyoshi, Kanagawa (JP);
Megumi Ichikawa, legal representative,
Kanagawa (JP); Katsuhiko Hiramatsu,
Kanagawa (JP); Akihiko Nishio,
Kanagawa (JP); Ryohei Kimura, Tokyo
(JP); Yoshiko Saito, Kanagawa (JP)

(73) Assignee: Panasonic Corporation, Osaka (JP)

( * ) Notice: Subject to any disclaimer, the term of this patent is extended or adjusted under 35 U.S.C. 154(b) by 494 days.

(21) Appl. No.: 12/988,458

(22) PCT Filed: Apr. 24, 2009

(86) PCT No.: PCT/JP2009/001889
§ 371 (c)(1),
(2), (4) Date: Jan. 12, 2011

(87) PCT Pub. No.: WO2009/130913
PCT Pub. Date: Oct. 29, 2009

(65) Prior Publication Data
US 2011/0098004 A1  Apr. 28, 2011

(30) Foreign Application Priority Data
Apr. 25, 2008 (JP) ................. 2008-115664

(51) Int. Cl.
*H04L 27/06* (2006.01)

(52) U.S. Cl.
USPC ...... 375/340; 375/243; 375/245; 375/240.22;
375/E7.048; 375/E7.034; 375/E7.245; 375/E7.267;
375/E7.139; 341/200; 455/67.11; 455/226.1

(58) Field of Classification Search
USPC ............... 375/340, 243, 245, 240.22, E7.048,
375/E7.034, E7.245, E7.267, E7.13, 9;
341/200; 455/67.11, 226.1
See application file for complete search history.

(56) References Cited

U.S. PATENT DOCUMENTS 6,370,190 B1  4/2002  Young
6,661,857 B1  12/2003  Webster (Continued)

FOREIGN PATENT DOCUMENTS

JP  2001-44895  2/2001
JP  2002-84166  3/2002

(Continued)

OTHER PUBLICATIONS

International Search Report dated Aug. 4, 2009.

(Continued)

*Primary Examiner* — Daniel Washburn
*Assistant Examiner* — Rahel Guarino
(74) *Attorney, Agent, or Firm* — Dickinson Wright PLLC

(57) ABSTRACT

Provided is a wireless communication device which can improve the notification accuracy of the channel state information (CSI) without straining the feedback circuit. In this device, a channel estimator (105) uses a pilot signal input from a wireless receiver (102) to estimate the channel and obtain a plurality of path gains in each of a plurality of delay periods. Then, the channel estimator (105) outputs the plurality of path gains to a quantizer (107). The quantizer (107) quantizes the plurality of path gains in the number of notification bits corresponding to each of the plurality of delay periods based on the correspondence of the delay period and the number of notification bits input from a setting unit (106).

6 Claims, 25 Drawing Sheets

(56) References Cited

U.S. PATENT DOCUMENTS

| | | |
|---|---|---|
| 6,792,049 B1 | 9/2004 | Bao |
| 7,639,643 B2 * | 12/2009 | Sadri et al. ............. 370/329 |
| 7,649,861 B2 * | 1/2010 | Maltsev et al. ............. 370/328 |
| 8,023,457 B2 * | 9/2011 | Kotecha et al. ............. 370/329 |
| 2001/0026596 A1 * | 10/2001 | Orihashi et al. ............. 375/316 |
| 2007/0070956 A1 | 3/2007 | Seki |

FOREIGN PATENT DOCUMENTS

| | | |
|---|---|---|
| JP | 2004-503171 | 1/2004 |
| JP | 2004-503993 | 2/2004 |
| JP | 2007-096960 | 4/2007 |

OTHER PUBLICATIONS

Y. Ohwatari, et al., "A Study on Reduction Schemes of Feedback Amount in MIMO-OFDM Eigenbeam-Space Division Multiplexing Systems," IEICE Technical Report, RCS2006-229, Jan. 2007, pp. 73-78.

* cited by examiner

| SAMPLE NUMBER | NUMBER OF REPORTING BITS | EXAMPLE OF BIT STREAMS AFTER CSI QUANTIZATION |
|---|---|---|
| 1 | 15 | 010010100010011 |
| 2 | 14 | 00000000000000 |
| 3 | 13 | 1001000100101 |
| 4 | 12 | 000000000000 |
| 5 | 11 | 00000000000 |
| 6 | 10 | 0000000000 |
| 7 | 9 | 000000000 |
| 8 | 8 | 01000100 |
| 9 | 7 | 0000000 |
| 10 | 6 | 000000 |
| 11 | 5 | 00000 |
| 12 | 4 | 0101 |
| 13 | 3 | 000 |
| 14 | 2 | 00 |
| 15 | 1 | 0 |

FIG.4

| CLUSTER NUMBER | SAMPLE NUMBER | NUMBER OF REPORTING BITS PER UNIT ELECTRIC POWER | NUMBER OF REPORTING BITS |
|---|---|---|---|
| 1 | 1 | 1.2 | 17 |
| 1 | 2 | 1.2 | 16 |
| 1 | 3 | 1.2 | 15 |
| 1 | 4 | 1.2 | 14 |
| 1 | 5 | 1.2 | 13 |
| 2 | 6 | 0.8 | 8 |
| 2 | 7 | 0.8 | 7 |
| 2 | 8 | 0.8 | 6 |
| 2 | 9 | 0.8 | 5 |
| 2 | 10 | 0.8 | 4 |
| 3 | 11 | 1.0 | 5 |
| 3 | 12 | 1.0 | 4 |
| 3 | 13 | 1.0 | 3 |
| 3 | 14 | 1.0 | 2 |
| 3 | 15 | 1.0 | 1 |

FIG.8

| CLUSTER NUMBER | SAMPLE NUMBER | NUMBER OF REPORTING BITS PER UNIT ELECTRIC POWER | NUMBER OF REPORTING BITS |
|---|---|---|---|
| 1 | 1 | 0.8 | 13 |
| 1 | 2 | 0.8 | 12 |
| 1 | 3 | 0.8 | 11 |
| 1 | 4 | 0.8 | 10 |
| 1 | 5 | 0.8 | 9 |
| 2 | 6 | 1.0 | 10 |
| 2 | 7 | 1.0 | 9 |
| 2 | 8 | 1.0 | 8 |
| 2 | 9 | 1.0 | 7 |
| 2 | 10 | 1.0 | 6 |
| 3 | 11 | 1.2 | 7 |
| 3 | 12 | 1.2 | 6 |
| 3 | 13 | 1.2 | 5 |
| 3 | 14 | 1.2 | 4 |
| 3 | 15 | 1.2 | 3 |

FIG.12

| CLUSTER NUMBER | SAMPLE NUMBER | NUMBER OF REPORTING BITS PER UNIT ELECTRIC POWER | NUMBER OF REPORTING BITS |
|---|---|---|---|
| 1 | 1 | 1.2 | 16 |
| 1 | 2 | 1.2 | 15 |
| 1 | 3 | 1.2 | 14 |
| 1 | 4 | 1.2 | 13 |
| 1 | 5 | 1.2 | 12 |
| 2 | 6 | 1.0 | 10 |
| 2 | 7 | 1.0 | 9 |
| 2 | 8 | 1.0 | 8 |
| 2 | 9 | 1.0 | 7 |
| 2 | 10 | 1.0 | 6 |
| 3 | 11 | 0.8 | 4 |
| 3 | 12 | 0.8 | 3 |
| 3 | 13 | 0.8 | 2 |
| 3 | 14 | 0.8 | 1 |
| 3 | 15 | 0.8 | 0 |

FIG.14

| CLUSTER NUMBER | SAMPLE NUMBER | SAMPLE INTERVAL | NUMBER OF REPORTING BITS |
|---|---|---|---|
| 1 | 1 | | 8 |
| 1 | 3 | 2 | 8 |
| 1 | 5 | 2 | 8 |
| 1 | 7 | 2 | 8 |
| 1 | 9 | 2 | 8 |
| 2 | 9.6 | 0.6 | 8 |
| 2 | 10.2 | 0.6 | 8 |
| 2 | 10.8 | 0.6 | 8 |
| 2 | 11.4 | 0.6 | 8 |
| 2 | 12 | 0.6 | 8 |
| 3 | 12.6 | 0.6 | 8 |
| 3 | 13.2 | 0.6 | 8 |
| 3 | 13.8 | 0.6 | 8 |
| 3 | 14.4 | 0.6 | 8 |
| 3 | 15 | 0.6 | 8 |

FIG.21

| CLUSTER NUMBER | SAMPLE NUMBER | NUMBER OF REPORTING BITS PER UNIT ELECTRIC POWER | NUMBER OF REPORTING BITS |
|---|---|---|---|
| 1 | 1 | 1.2 | 17 |
| 1 | 2 | 1.2 | 16 |
| 1 | 3 | 1.2 | 15 |
| 1 | 4 | 1.2 | 14 |
| 1 | 5 | 1.2 | 13 |
| 2 | 6 | 1 | 8 |
| 2 | 7 | 1 | 8 |
| 2 | 8 | 1 | 8 |
| 2 | 9 | 1 | 8 |
| 2 | 10 | 1 | 8 |
| 3 | 11 | 0.8 | 4 |
| 3 | 12 | 0.8 | 3 |
| 3 | 13 | 0.8 | 2 |
| 3 | 14 | 0.8 | 1 |
| 3 | 15 | 0.8 | 0 |

FIG.24

| CLUSTER NUMBER | SAMPLE NUMBER | NUMBER OF REPORTING BITS PER UNIT ELECTRIC POWER | NUMBER OF REPORTING BITS |
|---|---|---|---|
| 1 | 1 | 1.2 | 17 |
| 1 | 2 | 1.2 | 16 |
| 1 | 3 | 1.2 | 15 |
| 1 | 4 | 1.2 | 14 |
| 1 | 5 | 1.2 | 13 |
| 2 | 6 | 1.0 | 10 |
| 2 | 7 | 1.0 | 9 |
| 2 | 8 | 1.0 | 8 |
| 2 | 9 | 1.0 | 7 |
| 2 | 10 | 1.0 | 6 |
| 3 | 11 | — | 2 |
| 3 | 12 | — | 2 |
| 3 | 13 | — | 2 |
| 3 | 14 | — | 2 |
| 3 | 15 | — | 2 |

FIG.25

WIRELESS COMMUNICATION DEVICE AND QUANTIZATION METHOD

TECHNICAL FIELD

The present invention relates to a radio communication apparatus and a quantizing method.

BACKGROUND ART

In recent year, radio communication systems typified by a mobile telephone system and so forth have offered diversified services, and therefore are required to transmit not only speech data but also large volume of data such as still image data and moving image data. To realize transmission of large volume of data, studies are actively underway related to a pre-coding technique and an adaptive modulation and coding (AMC) technique directed to improving the efficiency of use of frequencies and reducing interference.

With the pre-coding technique, a radio communication apparatus in the data transmitting side performs linear signal processing or non-linear signal processing on transmission data, based on channel information (CSI: channel state information) estimated in a radio communication apparatus in the data receiving side. By this means, a radio communication apparatus in the data transmitting side is able to transmit transmission data with interference components suppressed in advance, which is added in a channel (propagation path). That is, it is possible to provide a channel equivalent to an optimal channel by using the pre-coding technique. The pre-coding technique is being studied also by 3GPP LTE (3rd Generation. Partnership Project Long-Term Evolution).

On the other hand, with the adaptive modulation and coding technique, for example, in order to satisfy a required QoS (quality of service), the radio communication apparatus in the data transmitting side adaptively controls the modulation scheme and the modulation and coding scheme (MCS) of transmission data based on CSI estimated in the radio communication apparatus in the data receiving side.

As described above, to use the pre-coding technique and the adaptive modulation and coding technique, the radio communication apparatus in the data transmitting side needs to have CSI estimated in the radio communication apparatus in the data receiving side. In a case of a frequency division duplex (FDD) system using different frequencies between the uplink and the downlink, in order to perform pre-coding or adaptive modulation and coding in the radio communication apparatus in the data transmitting side, the radio communication apparatus in the data receiving side needs to feed the estimated CSI of the downlink back to the radio communication apparatus in the data receiving side via the feedback channel. Therefore, an FDD system needs to prevent overload of the feedback channel due to an increase in the amount of feedback.

As a conventional technique for reducing the amount of feedback in the feedback channel, there is the technique for feeding hack CSI indicating path gains (power of paths) of only primary paths among a plurality paths having different delay times (for example, see Non-Patent Literature 1.) To be more specific, with this conventional technique, the radio communication apparatus in the data receiving side feeds, back to the radio communication apparatus in the data receiving side, CSI indicating path gains in the range including the primary range (for example, the range for the guard interval (GI) length) from the beginning path at the minimum delay time, among a plurality of path gains at each delay time. For example, this conventional technique defines proportion R of the path gain for the primary paths to the path gain for all paths (total path gain) (=the power with the primary path gain/the power with all path gains) [%]. Then, the radio communication apparatus in the data receiving side feeds, back to the radio communication apparatus in the data receiving side, CSI indicating path gains in the range including all path gains of R %, from the beginning path at the minimum delay time. That is, the remaining (100−R) % of all path gains is not reported to the radio communication apparatus in the data transmitting side. As a result of this, the amount of feedback is reduced in the feedback channel.

CITATION LIST

Non-Patent Literature

NPL 1
Y. Ohwatari, Y. Ogawa, T. Nishimura, T. Ohgane, "A Study on Reduction Schemes of Feedback Amount in MIMO-OFDM Eigenbeam-Space Division Multiplexing Systems", IEICE Technical Report, RCS2006-229, pp. 73-78, 2007-01

SUMMARY OF INVENTION

Technical Problem

Here, delay paths in the time domain influence channel variations in the frequency domain. A path with a small delay time influences moderate channel variation in the frequency domain and a path with a large delay time influences significant channel variation in the frequency domain.

However, as described above, with the above-described conventional technique, the remaining (100−R) % of all path gains is not reported to the radio communication apparatus in the data transmitting side. That is, CSI related to path gains of (100−R) % in large delay times is not fed back to the radio communication apparatus in the data transmitting side. Therefore, an error occurs between the fed back CSI and the CSI estimated in a radio communication apparatus in the data receiving side. That is, the accuracy of CSI reporting degrades. Thus, although the amount of feedback in the feedback channel is reduced by using the above-described conventional technique, it is not possible to reduce interference with a high degree of accuracy by pre-coding processing or select an appropriate MCS by AMC in a radio communication apparatus in the data transmitting side.

It is therefore an object of the present invention to provide a radio communication apparatus and a quantizing method allowing improvement of the accuracy of CSI reporting without overload of the feedback channel.

Means for Solving the Problem

The radio communication apparatus in the data receiving side according to the present invention adopts a configuration to include: an estimating section that performs channel estimation to obtain a plurality path gains at each of a plurality of delay times; and a quantizing section that quantizes the plurality of path gains with numbers of quantization bits respectively associated with the plurality of delay times.

Advantageous Effects of Invention

According to the present invention, it is possible to improve the accuracy of CSI reporting without overload of the feedback channel.

BRIEF DESCRIPTION OF DRAWINGS

FIG. 4 is a table showing the number of CST reporting bits according to Embodiment 1 of the present invention;

FIG. 8 is a table showing the number of reporting bits of CSI according to Embodiment 2 of the present invention;

FIG. 12 is a table showing the number of reporting bits of CSI according to Embodiment 3 of the present invention;

FIG. 14 is a table showing the number of reporting bits of CSI according to Embodiment 3 of the present invention;

FIG. 21 is another table showing the number of reporting bits according to the present invention;

FIG. 24 is another table showing the number of reporting bits according to the present invention; and FIG. 25 is another table showing the number of reporting bits according to the present invention.

BEST MODE FOR CARRYING OUT THE INVENTION

Now, embodiments of the present invention will be described in detail with reference to the accompanying drawings. Now, a case of an FDD system will be described here where the frequency used in signal transmission from the radio communication apparatus in the data transmitting side to the radio communication apparatus in the data receiving side is different from the frequency used in signal transmission from the radio communication apparatus in the data receiving side to the radio communication apparatus in the data transmitting side.

In addition, in the following descriptions, fifteen sample points (sample number 1 to 15) are set in a CSI reporting coverage, which is the range of delay times required to report CSI. That is, the radio communication apparatus in the data receiving side obtains the path gain (power of paths) for fifteen sample points (delay times). In addition, the delay time intervals of the sample points of the numbers 1 to 15 are set at even intervals. Moreover, CSI fed back from the communication apparatus in the data receiving side to the radio communication apparatus in the data transmitting side is composed of 120 bits. That is, the number of quantization bits to quantize the path gain at every sample point, that is, the total number of reporting bits to report CSI indicating the path gain at every sample point is 120.

In addition, the radio communication apparatus in the data receiving side and the radio communication apparatus in the data transmitting side know in advance a power delay profile indicating the relationship between delay times and reduction in the average path gain (average power) in channels used in signal transmission from the radio communication apparatus in the data receiving side to the radio communication apparatus in the data transmitting side.

Embodiment 1

With the present embodiment, a plurality of path gains are quantized with the numbers of reporting bits according to respective average path gains at a plurality delay times.

Figure 1:
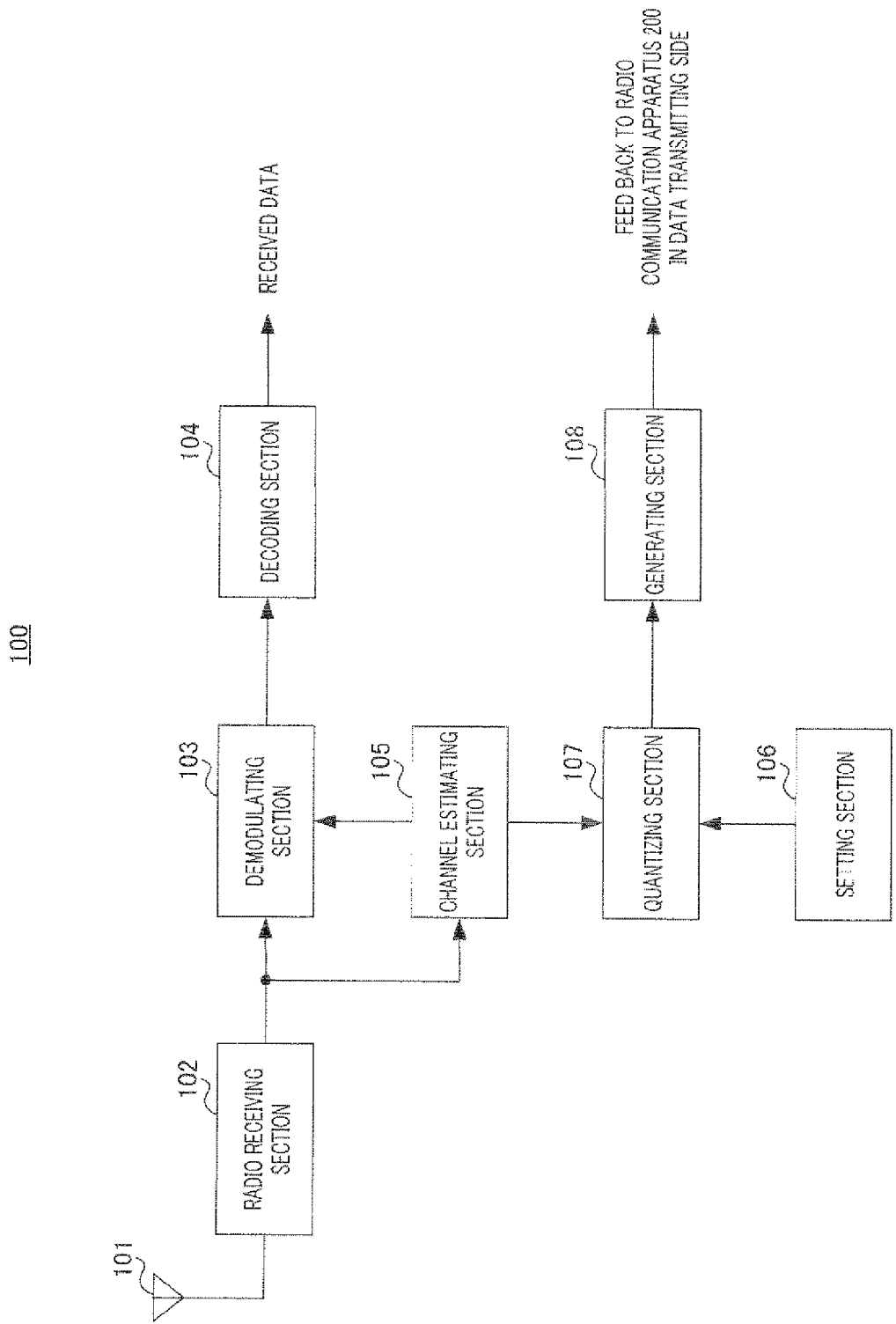
FIG. 1 is a block diagram showing a configuration of a radio communication apparatus in the data receiving side according to Embodiment 1 of the present invention.

Now, the configuration of a radio communication apparatus in the data receiving side according to the present embodiment will be described. FIG. 1 shows the configuration of radio communication apparatus 100 in the data receiving side according to the present embodiment. In radio communication apparatus 100, radio receiving section 102 receives signals from radio communication apparatus 200 in the data transmitting side described later via antenna 101. Here, signals transmitted from radio communication apparatus 200 in the data transmitting side include data signals and pilot signals. Radio receiving section 102 performs receiving processing on received signals, including down-conversion, A/D conversion and so forth, outputs data signals after receiving processing to demodulating section 103, and outputs pilot signals after receiving processing to channel estimating section 105.

Demodulating section 103 demodulates data signals inputted from radio receiving section 102 using channel impulse response (CIR) inputted from channel estimating section 105 described later and outputs data signals after modulation to decoding section 104.

Decoding section 104 decodes the data signal inputted from demodulating section 103 to obtain received data.

Channel estimating section 105 performs channel estimation using pilot signals inputted from radio receiving section 102 and generates a CIR of paths at a plurality of delay times.

That is, channel estimating section 105 performs channel estimation using pilot signals to obtain plurality of path gains at each of a plurality of delay times (sample points). Then, channel estimating section 105 outputs the generated CIR to demodulating section 103 and quantizing section 107.

Setting section 106 sets associations between a plurality of delay times and the numbers of reporting bits. To be more specific, setting section 106 sets a greater number of reporting bits to quantize path gains estimated in channel estimating section 105, for a delay time (sample point) having a greater average path gain. That is, setting section 106 sets numbers of reporting bits such that the accuracy of CSI reporting is higher at a delay time (sample point) having a greater average path gain. Then, setting section 106 outputs associations between delay times and numbers of reporting bits to quantizing section 107.

Quantizing section 107 quantizes a CIR inputted from channel estimating section 105 based on associations between delay times and numbers of reporting bits inputted from setting section 106. That is, quantizing section 107 obtains CSI by quantizing a plurality of path gains constituting a CIR with the numbers of reporting bits respectively associated with a plurality of delay times. Then, quantizing section 107 outputs the obtained CSI to CSI generating section 108.

Generating section 108 generates CSI information containing the CSI inputted from quantizing section 107. Then, generating section 108 feeds the generated CSI information back to radio communication apparatus 200 in the data transmitting side described later via the feedback channel.

Figure 2:
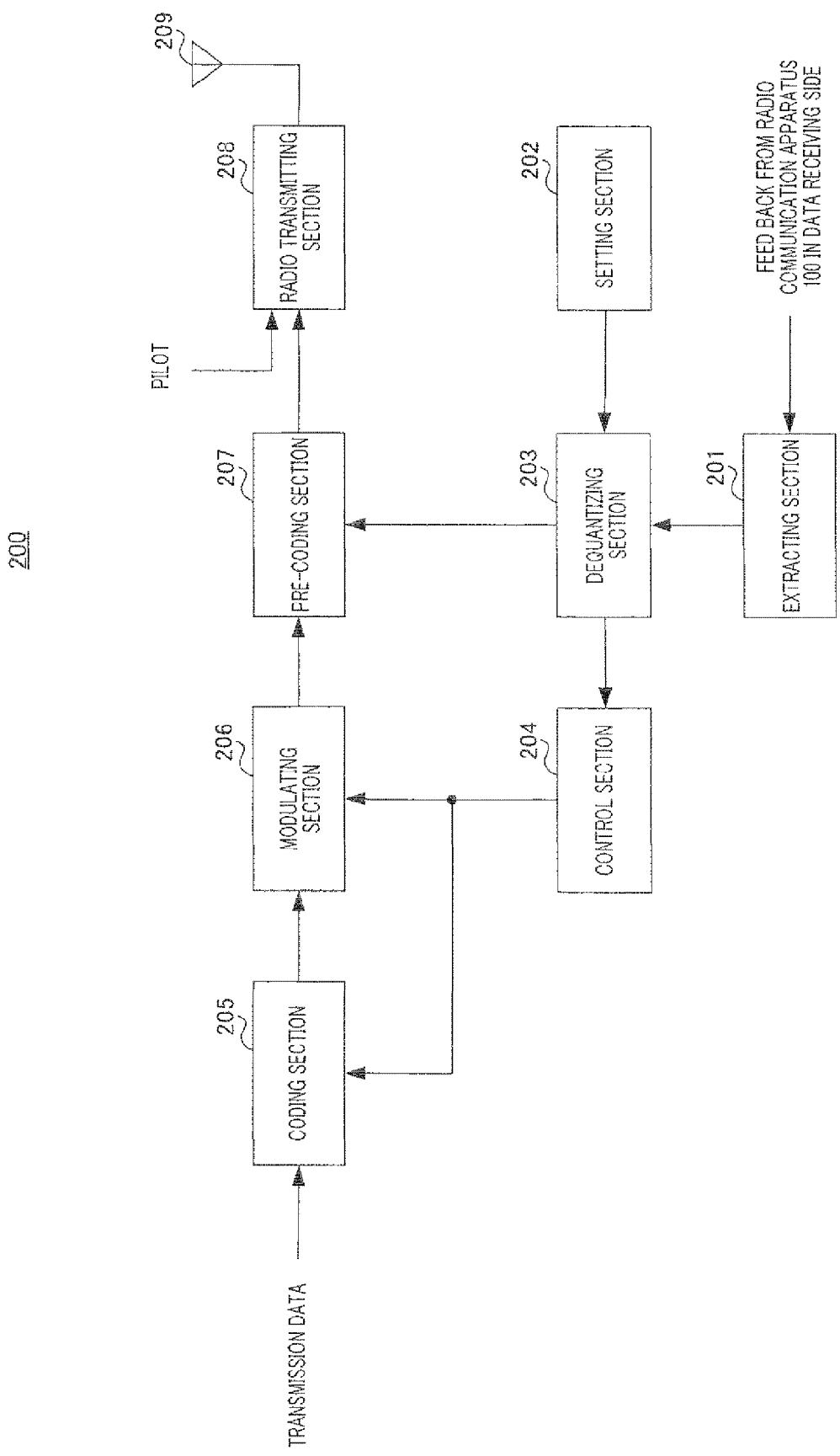
FIG. 2 is a block diagram showing a configuration of a radio communication apparatus in the data transmitting side according to Embodiment 1 of the present invention.

Next, the configuration of a radio communication apparatus in the data transmitting side according to the present embodiment will be described. FIG. 2 shows the configuration of radio communication apparatus 200 according to the present embodiment.

In radio communication apparatus 200 in the data transmitting side, extracting section 201 extracts CSI from CSI information fed back from radio communication apparatus 100 (FIG. 1) in the data receiving side. Then, extracting section 201 outputs the extracted CSI to dequantizing section 203. This CSI is composed of a plurality of bit streams indicating a plurality of path gains at respective delay times (sampling points).

Setting section 202 sets associations between a plurality of delay times and numbers of reporting bits in the same way as in setting section 106 (FIG. 1) of radio communication apparatus 100 in the data receiving side. That is, setting section 202 and setting section 106 shares the same associations between delay times and numbers of reporting bits. To be more specific, setting section 202 sets a greater number of reporting bits to use in dequantizing section 203, for a delay time (sample point) with a greater average gain. Then, setting section 202 outputs associations between delay times and numbers of reporting bits to dequantizing section 203.

Dequantizing section 203 dequantizes CSI inputted from extracting section 201, based on associations between delay times and numbers of reporting bits inputted from setting section 202. To be more specific, dequantizing section 203 dequantizes bit streams indicating a plurality of path gains at respective delay times (sample points) with numbers of reporting bits respectively associated with a plurality of delay times. Then, dequantizing section 203 outputs a plurality of path gains after dequantization, that is, a CIR, to control section 204 and pre-coding section 207.

Control section 204 adaptively controls the coding rate and the modulation scheme based on the CIR inputted from dequantizing section 203. For example, control section 204 calculates channel quality information (e.g. signal-to-interference plus noise ratio (SINR)) using a CIR inputted from dequantizing section 203. Here, control section 204 holds in advance an MCS table in which SINRs are associated with coding rates and modulation schemes. Then, control section 204 selects coding rates and modulation schemes to satisfy the required QoS with reference to the MCS table. Then, control section 204 outputs the selected coding rate and modulation scheme, to coding section 205 and modulating section 206.

Coding section 205 encodes transmission data according to the coding rate inputted from control section 204 and outputs transmission data after encoding to modulating section 206.

Modulating section 206 modulates transmission data inputted from coding section 205 according to the modulation scheme inputted from control section 204 and outputs transmission data after modulation to pre-coding section 207.

Pre-coding section 207 performs pre-coding processing on transmission data inputted from modulating section 206, using the CIR (that is, a plurality of path gains after dequantization) inputted from dequantizing section 203. Then, pre-coding section 205 outputs transmission data after pre-coding processing to data transmitting section 208.

Radio transmitting section 208 performs transmission processing including D/A conversion, up-conversion and so forth, on pilot signals and transmission data inputted from pre-coding section 207 and transmits signals after transmission processing from antenna 209 to radio communication apparatus 100 (FIG. 1) in the data receiving side.

Next, an example of setting of numbers of reporting bits in radio communication apparatus 100 (FIG. 1) in the data receiving side and in radio communication apparatus 200 (FIG. 2) in the data transmitting side will be described.

Figure 3:
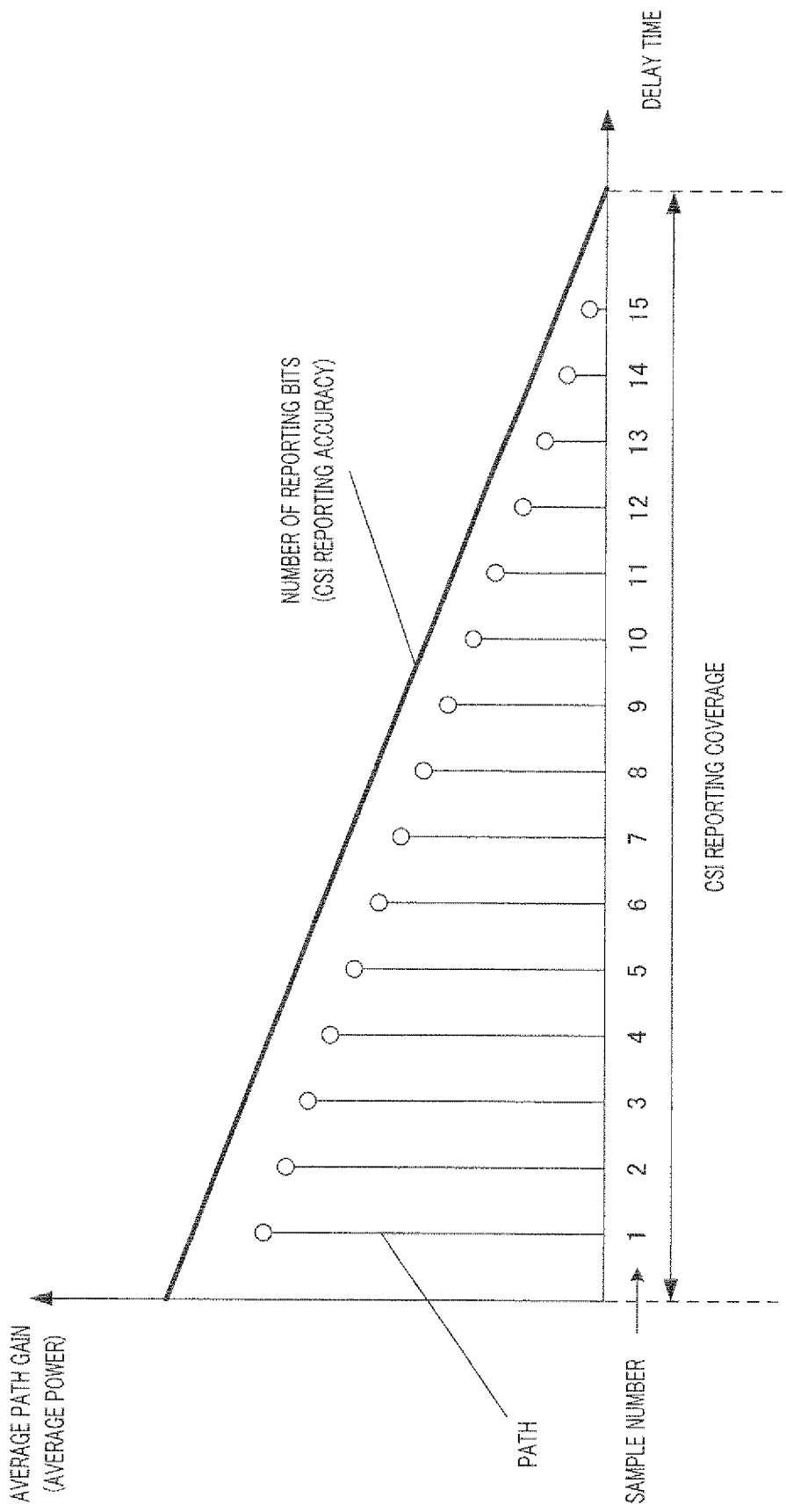
FIG. 3 is a drawing showing the number of reporting bits per delay time according to Embodiment 1 of the present invention.

In mobile communication, generally, the average path gain (average power) for paths monotonically decreases with an increase in delay times. To be more specific, in a power delay profile indicating the relationship between delay times and reduction in average path gain (average power), average path gain (average power) monotonically decreases with an increase in delay times as shown in FIG. 3. That is, the form shown in FIG. 3, that is, the magnitude of average path gain (average power) is not uniform with respect to delay times.

In addition, a delay time with a greater average path gain has a greater influence on pre-coding processing or adaptive modulation and coding processing in radio communication apparatus 200 in the data transmitting side. That is, to perform pre-coding processing and adaptive modulation and coding, a delay time with a greater average path gain needs to be fed back from radio communication apparatus 100 in the data receiving side in improved accuracy of CSI reporting.

Therefore, quantizing section 107 (FIG. 1) quantizes a plurality of path gains estimated in channel estimating section 105 with the numbers of reporting bits according to respective average path gain at a plurality of delay times. To be more specific, quantizing section 107 quantizes a plurality of path gains estimated in channel estimating section 105 such that a delay time with a greater average path gain is quantized with a greater number of reporting bits.

This will be described in detail below. First, setting section 106 (FIG. 1) and setting section 202 (FIG. 2) set the number of reporting bits according to the magnitude of the average path gain at each sample point (delay time). To be more specific, setting section 106 and setting section 202 set a greater number of reporting bits for a sample point (delay time) of a greater average gain.

That is, as shown in FIG. 3, in the power delay profile in which average path gain monotonically decreases with an increase in delay time, also the number of reporting bits decreases with an increase in delay times. That is, the accuracy of CSI reporting degrades with an increase in delay time. In other words, the accuracy of CSI reporting is improved at a smaller delay time.

For example, as shown in FIG. 3, the number of reporting bits is set the greatest for the sample point of sample number 1 at the smallest delay time, among the sample points of sample numbers 1 to 15 in the range of delay times, so that the accuracy of CSI reporting is the highest. On the other hand, the number of reporting bits is set the smallest for the sample point of sample number 15 at the greatest delay time, so that the accuracy of CSI reporting is the lowest.

FIG. 4 is a table providing an example of associations between sample points and numbers of reporting bits in the power delay profile shown in FIG. 3. As shown in FIG. 4, setting section 106 (setting section 202) sets the number of reporting bits at the sample point of sample number 1 (that is, the sample point at the smallest delay time in FIG. 3) to fifteen. Likewise, setting section 106 (setting section 202) sets the number of reporting bits at the sample point of sample number 2 (that is, the sample point at the second smallest delay time in FIG. 3) to fourteen. The same applies to sample numbers 3 to 15. That is, setting section 106 (setting section 202) sets numbers of reporting bits such that numbers of reporting bits decrease one by one with an increase in delay time (sample numbers).

Then, quantizing section 107 quantizes the CIR inputted from channel estimating section 105 according to the number of reporting bits according to the associations between sample points (delay times) and numbers of reporting bits shown in FIG. 4. To be more specific, the number of reporting bits is fifteen at the sample point of sample number 1 as shown in FIG. 4, quantizing section 107 obtains CSI of 15 bits (e.g. 010010100010011) by quantizing the path gain at the sample point of sample number 1 with 15 bits. Likewise, the number of reporting bits is fourteen at the sample point of sample number 2 as shown in FIG. 4, quantizing section 107 obtains CSI of 14 bits (e.g. 00000000000000) by quantizing the path gain at the sample point of sample number 2 with 14 bits. The same applies to sample points of sample number 3 to 15. Generated CSI is fed back to radio communication apparatus 200 in the data transmitting side via the feedback channel, as for example, a bit sequence of 120 bits arranged in order from sample number 1 to sample number 15 shown in FIG. 4.

On the other hand, setting section 202 (FIG. 2) of radio communication apparatus 200 (FIG. 2) in the data transmitting side outputs, to dequantizing section 203, the same associations between delay times and numbers of reporting bits as in setting section 106 (FIG. 1) in radio communication apparatus 100 in the data receiving side.

Then, dequantizing section 203 dequantizes CSI of 120 bits fed back via the feedback channel with the number of reporting bits corresponding to the associations shown in FIG. 4, in the same way as in quantizing section 107 (FIG. 1). To be more specific, since the number of reporting bits is fifteen at the sample point of sample number 1 as shown in FIG. 4, dequantizing section 203 obtains the path gain at the sample point of sample number 1 by dequantizing, for example, 15 bits from the beginning in the CSI of 120 bits. Likewise, since the number of reporting bits is fourteen at the sample point of sample number 2 as shown in FIG. 4, dequantizing section 203 obtains the path gain at the sample point of sample number 2 by dequantizing 14 bits from the bit immediately after the bits for the CSI of sample number 1 (that is, the sixteenth bit from the first bit). The same applies to sample points of sample numbers 3 to 15.

By this means, it is possible to obtain the path gains of sample number 1 to 15, that is, the CIR in the CSI reporting coverage shown in FIG. 3, in radio communication apparatus 200 in the data transmitting side. Therefore, in radio communication apparatus 200 in the data transmitting side, it is possible to perform pre-coding processing and adaptive modulation and coding processing using all path gains in the CSI reporting coverage shown in FIG. 3. In addition, CSI at a delay time with a greater average path gain is fed back from radio communication apparatus 100 in the data receiving side to radio communication apparatus 200 in the data transmitting side in higher reporting accuracy. Therefore, in radio communication apparatus 200 in the data transmitting side, the accuracy of CSI reporting to indicate path gains at delay times having a greater influence on pre-coding processing or adaptive modulation and coding processing is increased, so that it is possible to improve the accuracy of pre-coding processing and adaptive modulation and coding processing.

As described above, according to the present embodiment, a plurality of path gains are quantized with the numbers of reporting bits according to respective average path gain at a plurality of delay times (sample points). By this means, every CSI in the CSI reporting coverage is fed back with the number of reporting bits matching the magnitude of average path gain in the radio communication apparatus in the data transmitting side, so that it is possible to improve the accuracy of CSI reporting. In addition, a greater number of reporting bits are set for a delay time with a greater average path gain (having a greater influence on pre-coding processing and adaptive modulation and coding). That is, the radio communication apparatus in the data receiving side is able to perform pre-coding processing and adaptive modulation and coding processing using all CSI in the CSI reporting coverage, and also perform pre-coding processing and adaptive modulation and coding processing using CSI in higher reporting accuracy at a delay time with a greater average path gain. In addition, it is possible to reduce the amount of feedback because a smaller number of reporting bits are set for CSI at a delay time with a smaller average gain. Therefore, according to the present embodiment, it is possible to improve the accuracy of CSI reporting without overload of the feedback channel.

Embodiment 2

With the present embodiment, a plurality of delay times (sample points) are divided into a plurality of ranges. In the following descriptions, these ranges into which a plurality of delay times (sample points) are divided, are referred to as clusters.

Figure 5:
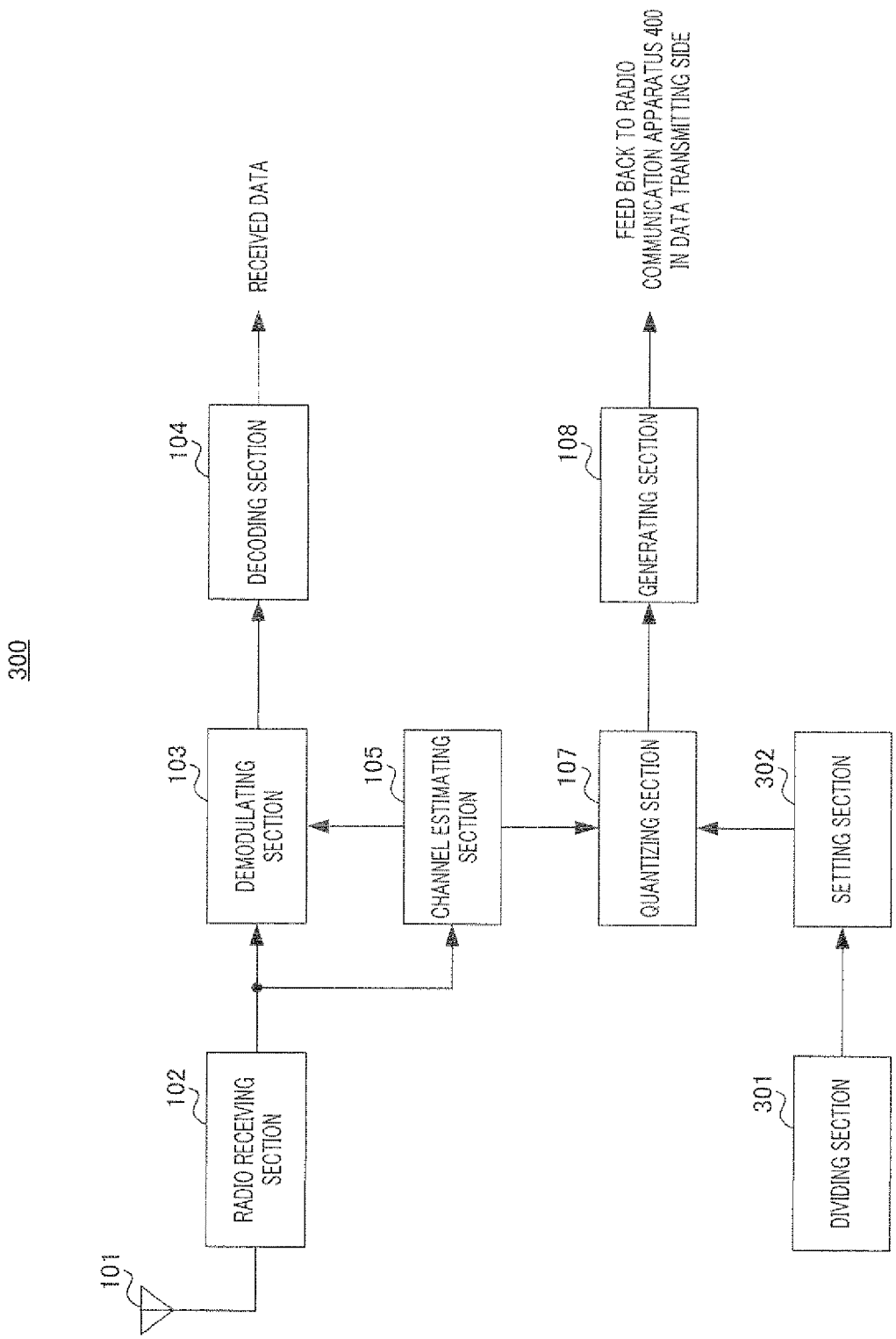
FIG. 5 is a block diagram showing a configuration of a radio communication apparatus in the data receiving side according to Embodiment 2 of the present invention.

FIG. 5 shows the configuration of radio communication apparatus 300 in the data receiving side according to the present embodiment. In FIG. 5, the same components as in Embodiment 1 (FIG. 1) are assigned the same reference numerals and descriptions will be omitted.

Dividing section 301 divides a CSI reporting coverage into a plurality of clusters. Then, dividing section 301 outputs division information indicating the length of each divided cluster (cluster size), the number of divided clusters and so forth, to setting section 302.

Setting section 302 sets the number of reporting bits per unit electric power of average path gain (that is, the reporting bit density per unit electric power of average path) for each of a plurality of clusters, based on division information inputted from dividing section 301. Then, setting section 302 sets associations between delay times and numbers of reporting bits using the number of reporting bits per unit electric power of average path gain set for each cluster. To be more specific, setting section 302 sets numbers of reporting bits respectively associated with a plurality of delay times, by multiplying the average path gain at each delay time by the number of reporting bits per unit electric power of average path gain set for each cluster.

Quantifying section 107 quantizes a plurality of path gains constituting a CIR inputted from channel estimating section 105 with the numbers of reporting bits obtained by multiplying the average path gain by the number of reporting bits per unit electric power of average path gain set for each of a plurality of clusters.

Figure 6:
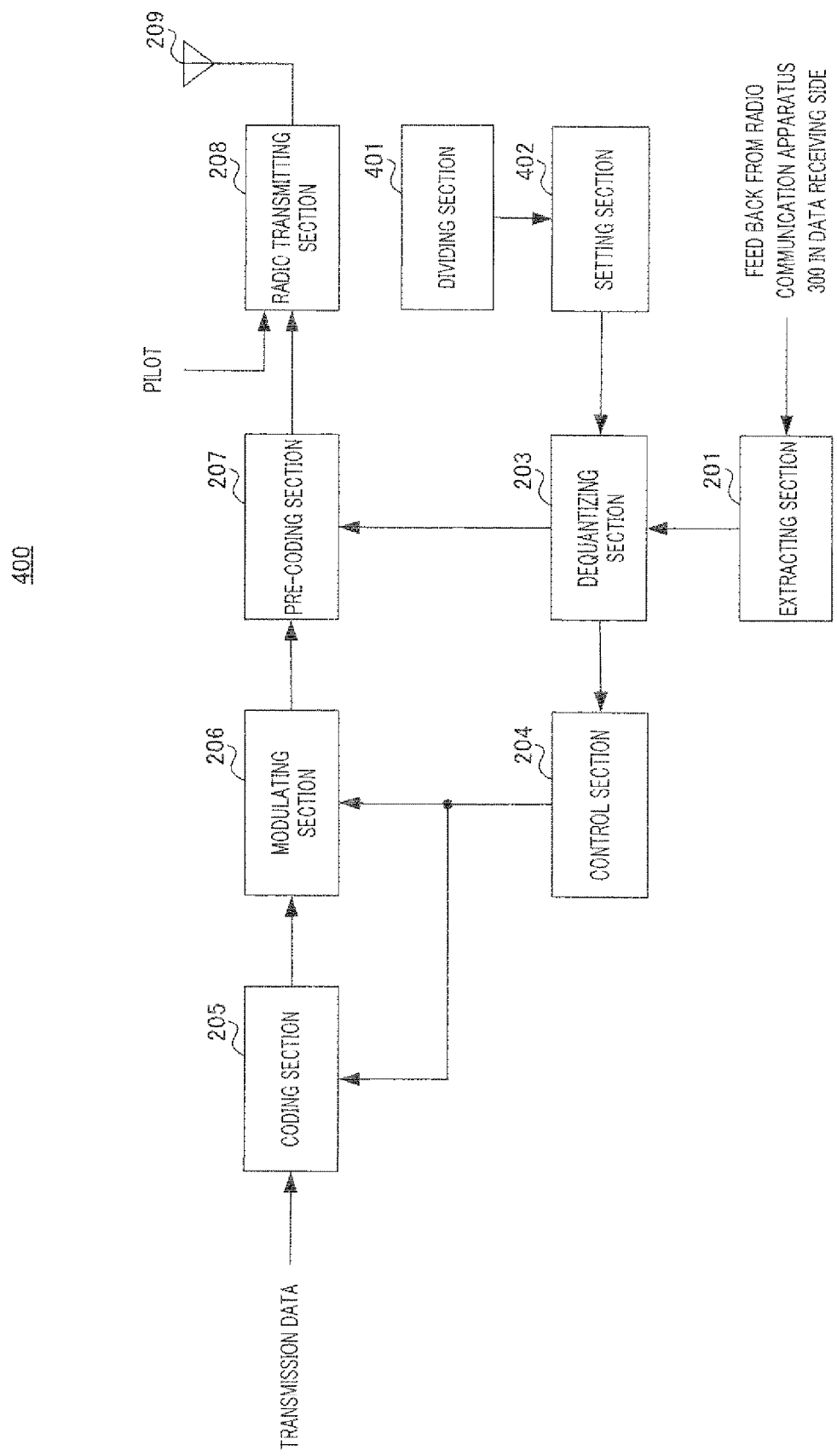
FIG. 6 is a block diagram showing a configuration of a radio communication apparatus in the data transmitting side according to Embodiment 2 of the present invention.

Next, FIG. 6 shows the configuration of radio communication apparatus 400 in the data transmitting side according to the present embodiment. In FIG. 6, the same components as in Embodiment 1 (FIG. 2) are assigned the same reference numerals and descriptions will be omitted.

Dividing section 401 divides a CSI reporting coverage into a plurality of clusters in the same way as in dividing section 301 (FIG. 5) in radio communication apparatus 300 in the data receiving side. Then, dividing section 401 outputs division information to setting section 402.

Setting section 402 sets associations between delay times and numbers of reporting bits using the number of reporting bits per unit electric power of average path gain set for each of a plurality of clusters, based on division information inputted from dividing section 401, in the same way as in setting section 302 in radio communication apparatus 300 in the data receiving side. To be more specific, setting section 402 sets numbers of reporting bits respectively associated with a plurality of delay times, by multiplying the average path gain at each delay time by the number of reporting bits per unit electric power of average path gain set for each cluster.

Dequantizing section 203 dequantizes a bit stream to indicate a plurality of path gains at each of a plurality of delay times (sample points) with the number of reporting bits obtained by multiplying the average path gain by the number of reporting bits per unit electric power of average path gain set for each of a plurality of clusters.

Next, an example of setting of numbers of reporting bits in radio communication apparatus 300 (FIG. 5) in the data receiving side and radio communication apparatus 400 (FIG. 6) in the data transmitting side.

Figure 7:
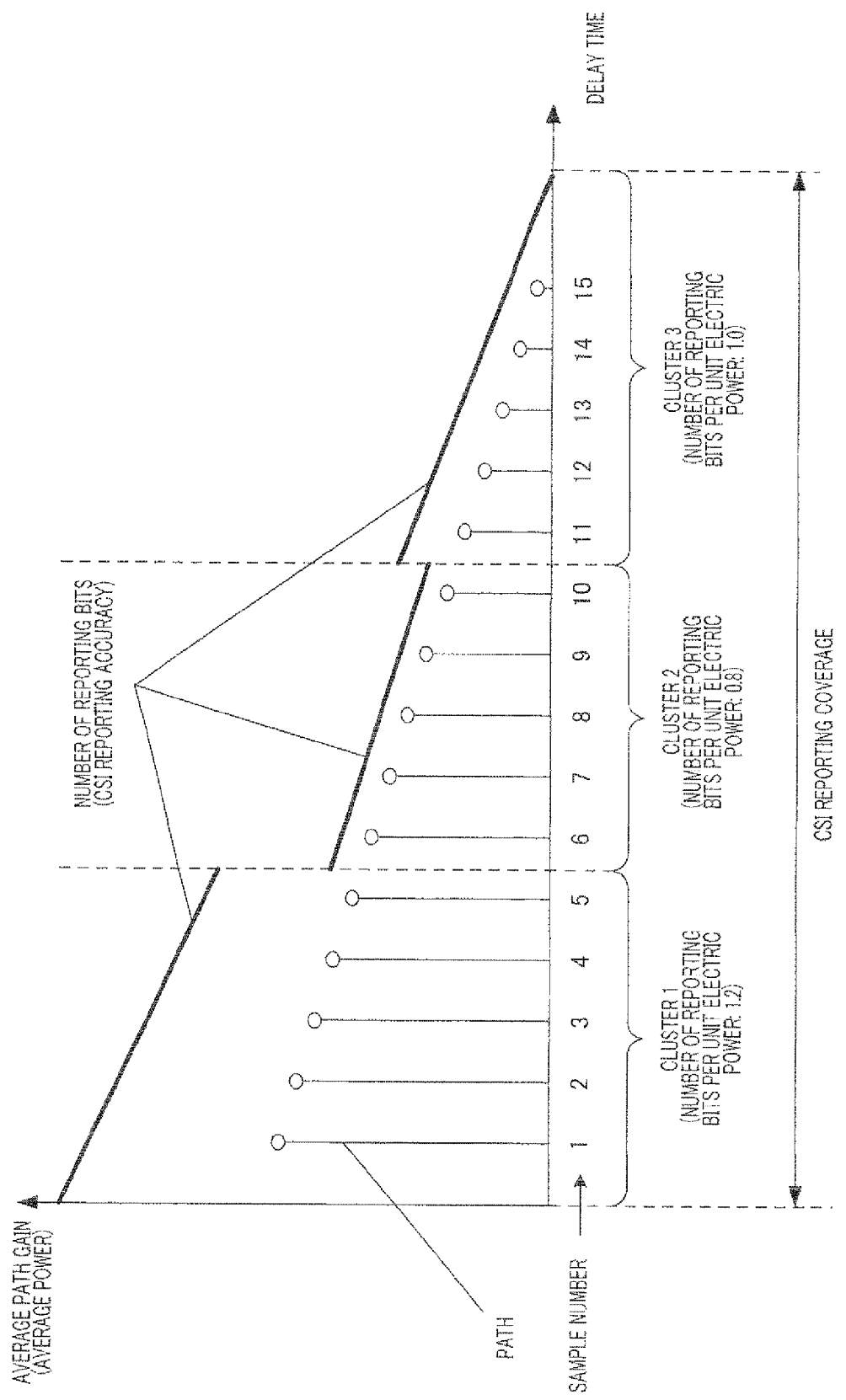
FIG. 7 is a drawing showing the number of reporting bits per delay time according to Embodiment 2 of the present invention.

In the following descriptions, average path gain monotonically decreases with an increase in delay time in the power delay profile shown in FIG. 7 in the same way as in Embodiment 1. In addition, dividing section 301 (dividing section 401) divides a CSI reporting coverage into three clusters. To be more specific, sample points of sample numbers 1 to 15 shown in FIG. 7 are divided every five samples. Therefore, as shown in FIG. 7, cluster 1 is composed of five samples of sample numbers 1 to 5, cluster 2 is composed of five samples of sample numbers 6 to 10 and cluster 3 is composed of five samples of sample numbers 11 to 15.

For example, as shown in FIG. 7, setting section 302 (setting section 402) sets the number of reporting bits per unit electric power of average path gain in cluster 1 to 1.2, sets the number of reporting bits per unit electric power of average path gain of cluster 2 to 0.8, and sets the number of reporting bits per unit electric power of average path gain in cluster 3 to 1.0. Then, setting section 302 (setting section 402) sets numbers of reporting bits respectively associated with a plurality of delay times, by multiplying the average path gain of each delay time by the number of reporting bits per unit electric power of average path gain set for each cluster.

By this means, as shown in FIG. 7, the degree of increase and decrease in the number of reporting bits, that is, the slope, between samples at even intervals, is different every cluster.

For example, as shown in FIG. 7, the degree of increase and decrease (slope) in the number of reporting bits between the sample of sample number 1 and the sample of sample number 5 in cluster 1 where the number of reporting bits per unit electric power of average path gain is 1.2 is greater than the degree of increase and decrease (slope) in the number of reporting bits between the sample of sample number 11 and the sample of sample number 15 in cluster 3 where the number of reporting bits per unit electric power of average path gain is 1.0. On the other hand, the degree of increase and decrease (slope) in the number of reporting bits between the sample of sample number 6 and the sample of sample number 10 in cluster 2 where the number of reporting bits per unit electric power of average path gain is 0.8 is smaller than the degree of increase and decrease (slope) in the number of reporting bits between the sample of sample number 11 and the sample of sample number 15 in cluster 3. That is, by setting the number of reporting bits per unit electric power of average path gain for each of a plurality of clusters, the degree of increase and decrease (slope) in the number of reporting bits varies between clusters, even at equal sample intervals.

FIG. 8 is a table providing an example of associations between sample points and numbers of bits in the power delay profile shown in FIG. 7. Here, the number of reporting bits at each sample point is calculated by multiplying the number of reporting bits per unit electric power of average path gain set for each of a plurality of clusters and the average path gain at each sample point. Here, if the number of reporting bits at each sample point is not an integer, round-up or round-down may be possible. In addition, the number of reporting bits at each sample point is adjusted such that the total number of reporting bits at all sample points of sample numbers 1 to 15, is set to 120 bits.

Therefore, as shown in FIG. 8, in cluster 1 in which the number of reporting bits per unit electric power of average path gain is 1.2, setting section 302 (setting section 402) sets the number of reporting bits at the sample point of sample number 1 to seventeen and sets the number of reporting bits at the sample point of sample number 2 to sixteen. The same applies to sample numbers 3 to 5. Likewise, as shown in FIG. 8, in cluster 2 in which the number of reporting bits per unit electric power of average path gain is 0.8, setting section 302 (setting section 402) sets the number of reporting bits at the sample point of sample number 6 to eight and sets the number of reporting bits at the sample point of sample number 7 to seven. The same applies to sample numbers 8 to 10. In addition, as shown in FIG. 8, in cluster 3 in which the number of reporting bits per unit electric power of average path gain is 1.0, setting section 302 (setting section 402) sets the number of reporting bits at the sample point of sample number 11 to five and sets the number of reporting bits at the sample point of sample number 12 to four. The same applies to sample numbers 13 to 15. As shown in FIG. 8, the generated CSI includes a bit sequence of 120 bits in the same way as in Embodiment 1 (FIG. 4).

Therefore, as shown in FIG. 8, quantizing section 107 quantizes the path gain at the sample point of sample number 1 with 17 bits, and quantizes the path gain at the sample point of sample number 2 with 16 bits. The same applies to the sample points of sample numbers 3 to 15. Then, generated CSI is fed back to radio communication apparatus 200 in the data transmitting side via the feedback channel as, for example, bit streams of 120 bits arranged in order from sample number 1 to sample number 15 shown in FIG. 4, in the same way as in Embodiment 1.

Likewise, dequantizing section 203 in radio communication apparatus 400 (FIG. 6) in the data transmitting side dequantizes CIS (bit streams indicating a plurality of path gains) inputted from extracting section 201 with numbers of reporting bits respectively associated with a plurality of delay times (sample points), based on the associations shown in FIG. 8.

Here, the number of reporting bits shown in FIG. 8 and the number of reporting bits shown in FIG. 4 in Embodiment 1 will be compared. Here, the number of reporting bits per unit electric power of average path gain at each sample point shown in FIG. 4 is 1.0. Among the number of reporting bits shown in FIG. 8, the number of reporting bits at the sample points of sample numbers 1 to 5 in cluster 1 where the number of reporting bits per unit electric power of average path gain is 1.2 is greater than the number of reporting bits at the sample points of sample numbers 1 to 5 shown in FIG. 4. On the other hand, the number of reporting bits at the sample points of sample numbers 6 to 10 in cluster 2 where the number of reporting bits per unit electric power is 0.8 is less than the number of reporting bits at the sample points of sample numbers 6 to 10 shown in FIG. 4. That is, in cluster 1 (sample numbers 1 to 5), the accuracy of CSI reporting is higher than at the sample points of sample numbers 1 to 5 shown in FIG. 4. On the other hand, in cluster 2 (sample numbers 6 to 10), the accuracy of CSI reporting is lower than at the sample points of sample numbers 6 to 10 shown in FIG. 4.

As described above, the number of reporting bits is set such that the number of reporting bits decreases with an increase in delay times (sample numbers) in each cluster (clusters 1 to 3) in the same way as in Embodiment 1, but the number of reporting bits per unit electric power of average path gain varies between clusters. By this means, it is possible to change the accuracy of CSI reporting between clusters while keeping a total number of CSI reporting bits constant. That is, by increasing the number of reporting bits per unit electric power of average path gain in the cluster corresponding to the range of delay times where the accuracy of CIS reporting needs to be improved, it is possible to improve the accuracy of CSI reporting.

Next, with the present embodiment, a case in which guard interval (GI) lengths is taken into account will be described.

To reduce influence of multipath distortion, a GI adding section (not shown) in radio communication apparatus 400 (FIG. 6) in the data transmitting side divides transmission data into blocks of a predetermined length and generates a signal obtained by adding a predetermined part of the end of each divided data to the beginning of a data component as a GI. This generated signal is transmitted from radio communication apparatus 400 in the data transmitting side and arrives at radio communication apparatus 300 in the receiving side through a channel (propagation path) where the direct wave and delayed waves are combined. By this means, radio communication apparatus 300 in the data receiving side is able to prevent interference when the delay time of a delayed wave is within a GI.

On the other hand, for a delay time beyond a GI, it is not possible to obtain the GI effect of preventing interference, so that the influence on pre-coding processing and adaptive modulation and coding processing increases even if the path gain is small.

In the following descriptions, therefore, dividing section 301 (FIG. 5) and dividing section 401 (FIG. 6) divide a CSI reporting coverage in the range of delay times into a coverage within a GI and a coverage beyond a GI.

That is, dividing section 301 and dividing section 401 set a cluster break point (delay time) at the end of a GI length.

Figure 9:
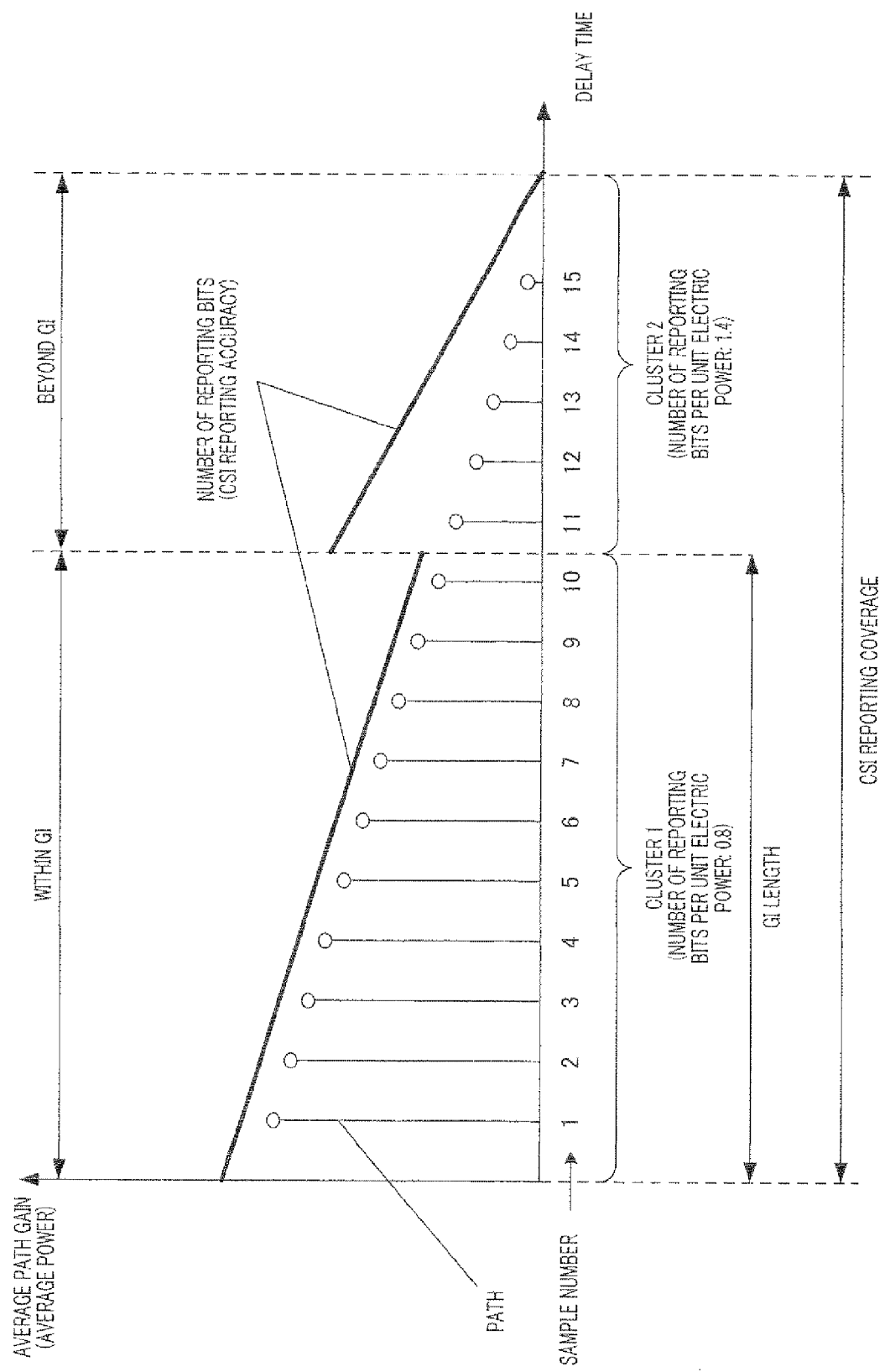
FIG. 9 is a drawing showing the number of reporting bits per delay time according to Embodiment 2 of the present invention.

To be more specific, sample points of sample numbers 1 to 10 shown in FIG. 9, that is, sample points included within the GI range constitute cluster 1, and sample points of sample numbers 11 to 15, that is, sample points included in the range beyond the GI constitute cluster 2.

Then, as shown in FIG. 9, setting section 302 (setting section 402) sets the number of bits per unit electric power of average path gain in cluster 1 to 0.8, and sets the number of bits per unit electric power of average path gain in cluster 2 to 1.4, for example. Therefore, the degree of increase and decrease (slope) in the number of reporting bits in cluster 2 where the number of reporting bits per unit electric power of average path gain is 1.4, is greater than the degree of increase and decrease (slope) in the number of reporting bits in cluster 1 where the number of reporting bits per unit electric power of average path gain is 0.8.

Figure 10:
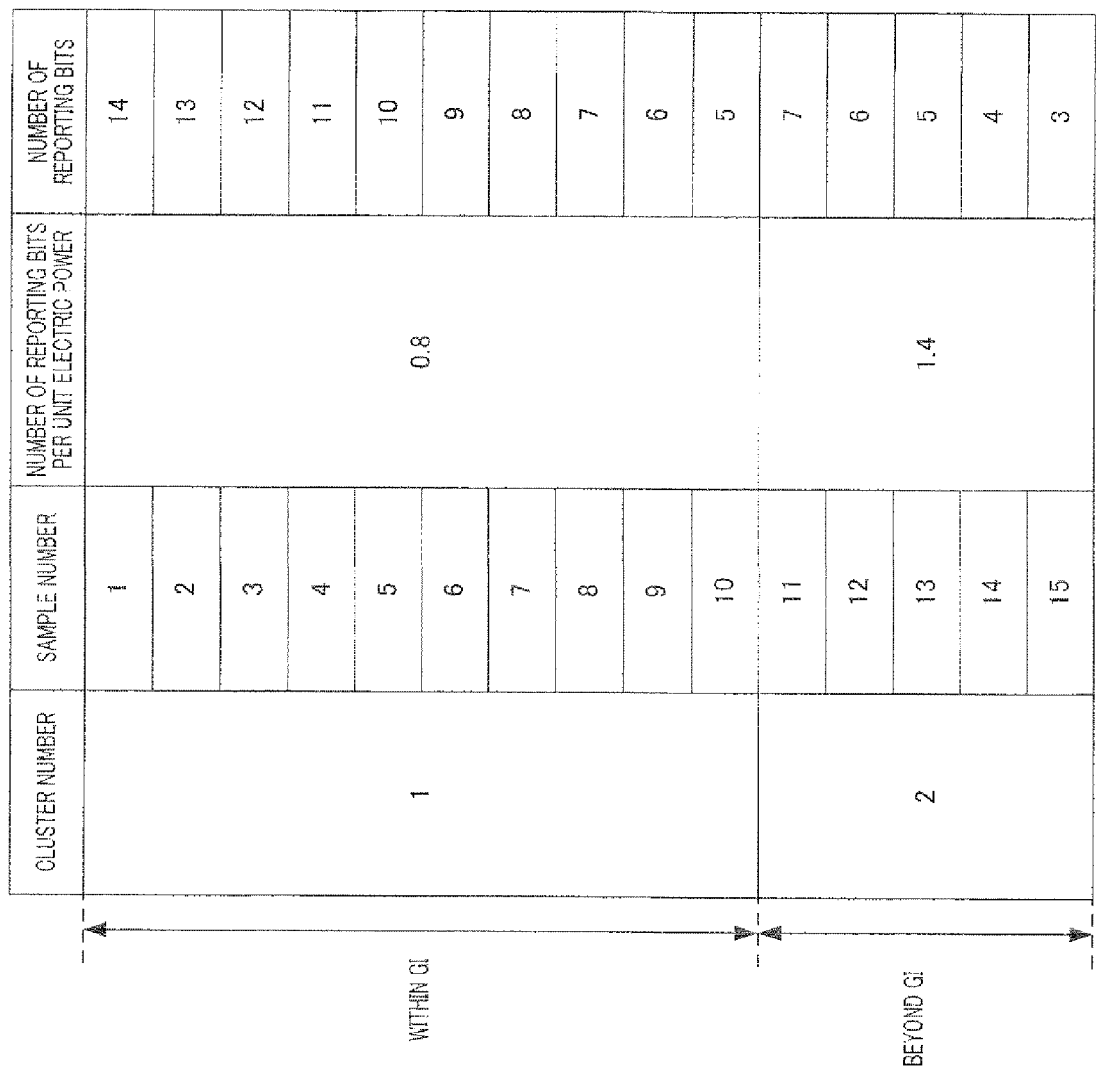
FIG. 10 is a table showing the number of reporting bits of CSI according to Embodiment 2 of the present invention.

FIG. 10 is a table providing an example of associations between sample points and the number of bits in the power delay profile shown in FIG. 9. As shown in FIG. 10, in cluster 1 in which the number of reporting bits per unit electric power of average path gain is 0.8, setting section 302 (setting section 402) sets the number of reporting bits at the sample point of sample number 1 to fourteen, and sets the number of reporting bits at the sample point of sample number 2 to thirteen. The same applies to sample numbers 3 to 10. Likewise, as shown in FIG. 10, in cluster 2 in which the number of reporting bits per unit electric power of average path gain is 1.4, setting section 302 (setting section 402) sets the number of reporting bits at the sample point of sample number 11 to seven and sets the number of reporting bits at the sample point of sample number 12 to six. The same applies to sample numbers 13 to 15.

By this means, in the range beyond the GI, that is, the range in which the effect of reducing interference by GI is not produced, the accuracy of CSI reporting is improved. Here, the total number of reporting bits in CSI is 120 as shown in FIG. 10, and is the same as in, for example, Embodiment 1 (FIG. 4). That is, it is possible to improve preferentially the accuracy of CSI reporting of the range (cluster 2) beyond the GI without an increase in a total number of CSI reporting bits. Therefore, pre-coding section 207 in radio communication apparatus 400 in the data transmitting side is able to suppress interference components due to paths in the range beyond the GI by performing pre-coding processing using CSI with higher reporting accuracy in the range beyond the GI.

By this means, with the present embodiment, a plurality of delay times are divided into a plurality of clusters. In addition, a plurality of path gains are quantized with the number of reporting bits obtained by multiplying the average path gain by the number of reporting bits per unit electric power of average path gain set for each of a plurality of clusters. By this means, it is possible to set more finely the accuracy of CSI reporting per cluster while keeping the total number of CSI reporting bits constant. Therefore, according to the present embodiment, it is possible to improve the accuracy of CSI reporting more than Embodiment 1.

Here, with the present embodiment, a case has been described where the CSI reporting coverage in a range of delay times is divided into two clusters including the range (cluster 1) within the GI and the range (cluster 2) beyond the GI. However, the present invention is not limited to the case in which a CSI reporting coverage in a range of delay times is divided into two clusters, but a CSI reporting coverage may be divided into three or more clusters as far as one of a plurality of cluster break points is set at the end of a GI length.

In addition, with the present embodiment, a case has been described where the number of reporting bits per unit electric power in the range beyond the GI, is greater than the number of reporting bits per unit electric power of average path gain within the GI range taking into account a case in which there are paths in the range beyond the GI. However, according to the present invention, when there is no path in the range beyond the GI, the number of reporting bits may be set such that the number of reporting bits per unit electric power of average path gain within the GI range, is greater than the number of reporting bits per unit electric power of average path gain in the range beyond the GI. For example, the number of reporting bits per unit electric power of average path gain in cluster 1 shown in FIG. 9 may be set to 1.2, and the number of reporting bits per unit electric power of average path gain in cluster 2 may be set to 0.8. By this means, the accuracy of CSI reporting within the GI range is preferentially improved, so that radio communication apparatus 400 in the data transmitting side is able to perform adaptive modulation and coding using CSI of higher reporting accuracy.

Embodiment 3

The present embodiment is different from Embodiment 2 in that a plurality of path gains are quantized using numbers of reporting bits per unit electric power of average path gains according to the magnitude of delay time in a plurality of clusters.

Figure 11:
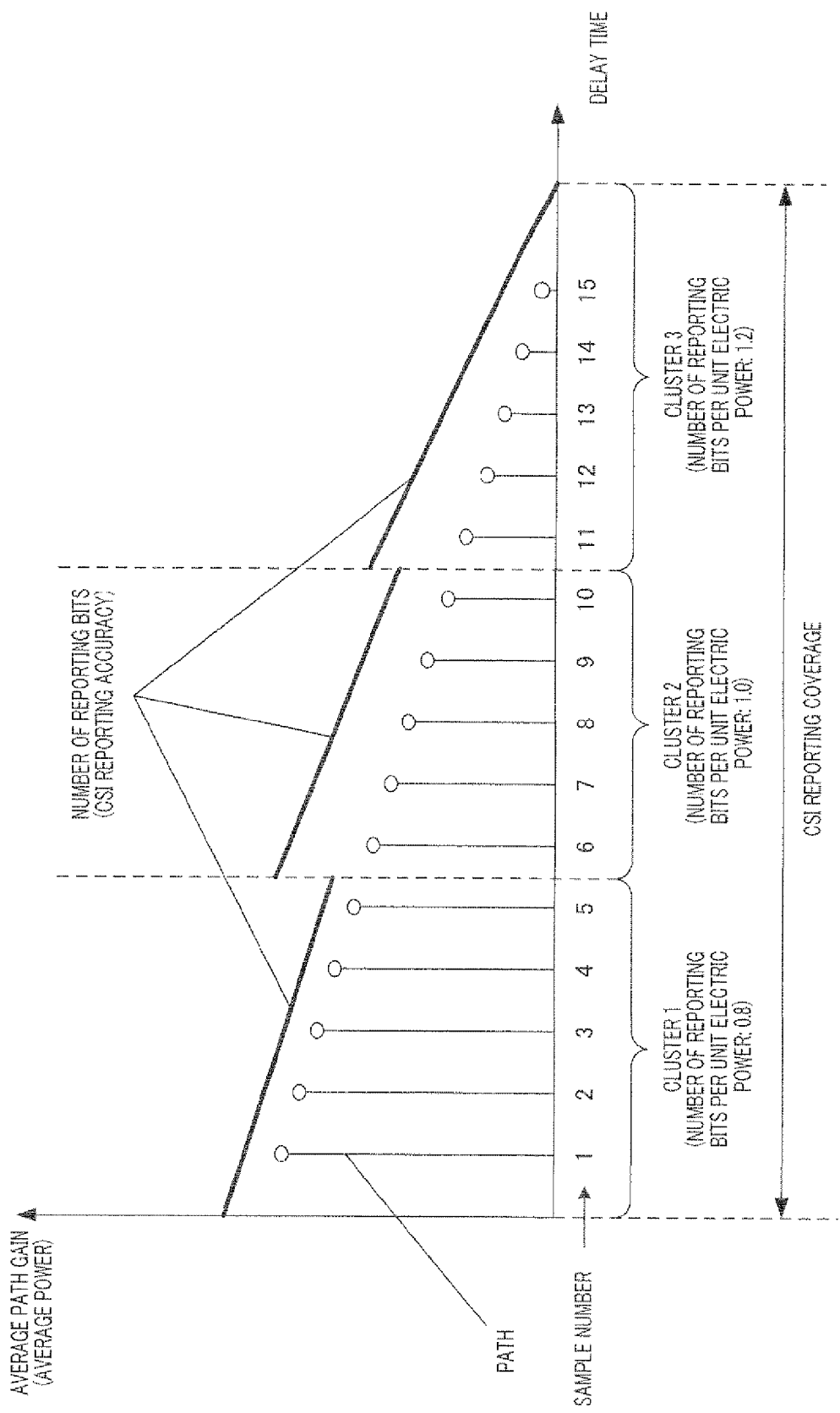
FIG. 11 is a drawing showing the number of reporting bits per delay time according to Embodiment 3 of the present invention.
Figure 13:
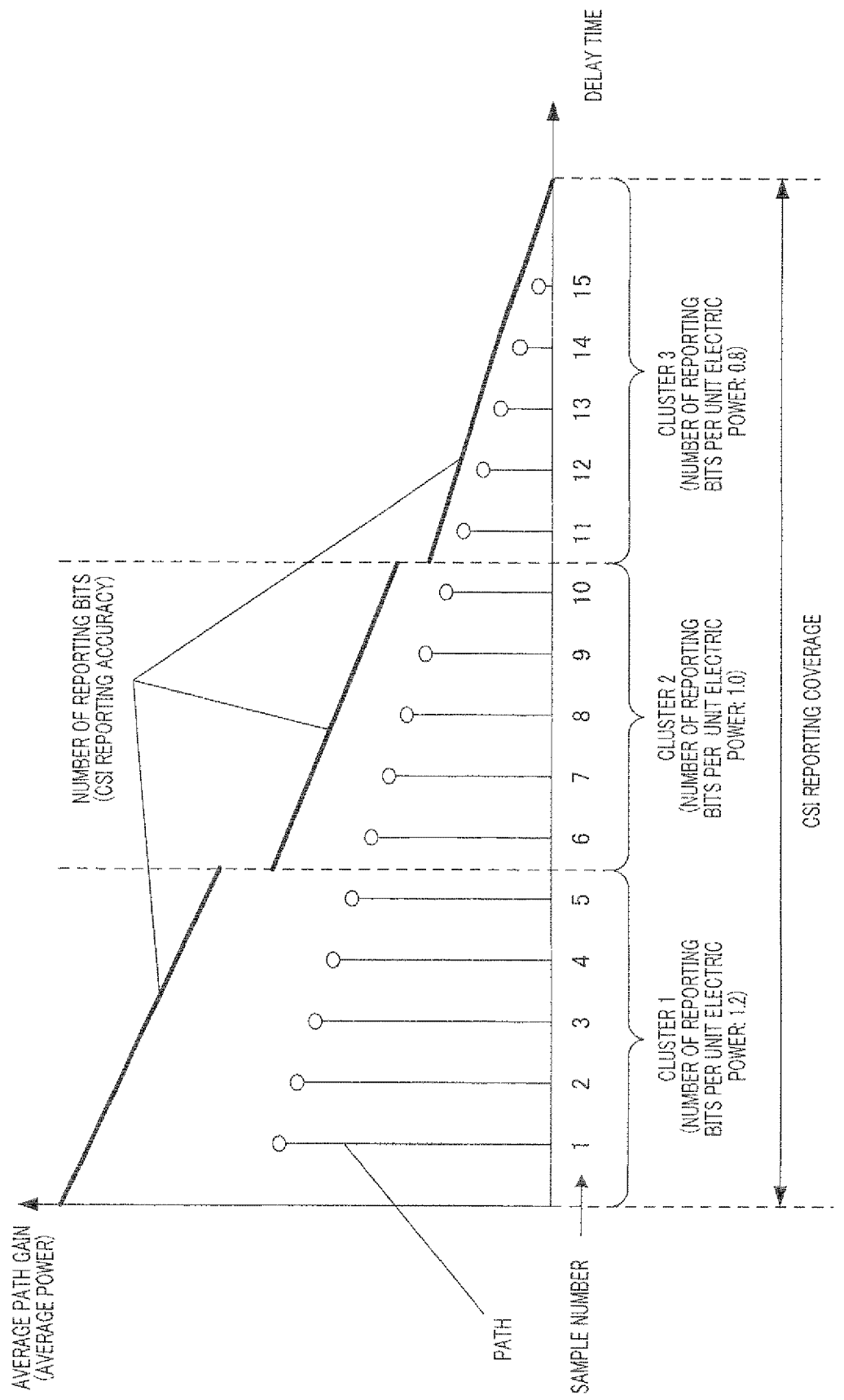
FIG. 13 is a drawing showing the number of reporting bits per delay time according to Embodiment 3 of the present invention.

Now, the present embodiment will be described in detail. In the following descriptions, in power delay profiles shown in FIG. 11 and FIG. 13, average path gain monotonically decreases with an increase in delay times in the same way as in Embodiment 2 (FIG. 7). In addition, as shown in FIG. 11 and FIG. 13, cluster 1 is composed of sample points of sample numbers 1 to 5, cluster 2 is composed of sample points of sample numbers 6 to 10, and cluster 3 is composed of sample points of sample numbers 11 to 15 in the same way as in Embodiment 2 (FIG. 7).

In addition, the number of reporting bits at each sample point shown in FIG. 12 and FIG. 14 is calculated by multiplying the number of reporting bits per unit electric power of average path gain in each cluster, and the average path gain at each sample point in the same way as in Embodiment 2. Here, if the number of reporting bits at each sample point is not an integer, round-up or round-down may be possible. In addition, the number of reporting bits at each sample point is adjusted such that the total number of reporting bits at all the sample points of sample numbers 1 to 15 is 120.

Setting Example 1

With this setting example, quantizing section 107 shown in FIG. 5 quantizes a plurality of path gains such that a plurality of path gains in a cluster including a greater delay time is quantized using a greater number of reporting bits per unit electric power of average path gain.

To be more specific, as shown in FIG. 11, setting section 302 (setting section 402) sets, for example, the number of bits per unit electric power of average path gain in cluster 1 to 0.8, sets the number of bits per unit electric power of average path gain in cluster 2 to 1.0 and sets the number of bits per unit electric power of average path gain in cluster 3 to 1.2. That is, setting section 302 (setting section 402) sets the number of reporting bits such that the number of reporting bits per unit electric power of average path gain in cluster 3 including a greater delay time is the greatest (1.2) and the number of bits per unit electric power of average path gain in cluster 1 including a smaller delay time is the smallest (0.8).

FIG. 12 is a table providing an example of associations between sample points and numbers of reporting bits in the power delay profile shown in FIG. 11. As shown in FIG. 12, in cluster 1 in which the number of reporting bits per unit electric power of average path gain is 0.8, setting section 302 (setting section 402) sets the number of reporting bits at the sample point of sample number 1 to thirteen, and sets the number of reporting bits at the sample point of sample number 2 to twelve. The same applies to sample numbers 3 to 5. As shown in FIG. 12, the same applies to cluster 2 (sample numbers 6 to 10) and cluster 3 (sample numbers 11 to 15).

Therefore, as shown in FIG. 12, quantizing section 107 quantizes the path gain at the sample point of sample number 1 with 13 bits and the path gain at the sample point of sample number 2 with 12 bits. The same applies to sample points of sample numbers 3 to 15. Therefore, as shown in FIG. 12, the generated CSI includes a bit sequence of 120 bits in the same way as in Embodiment 1 (FIG. 4).

Likewise, dequantizing section 203 in radio communication apparatus 400 (FIG. 6) in the receiving side dequantizes CSI (which bit streams indicating a plurality of path gains) inputted from extracting section 201 with numbers of reporting bits respectively associated with a plurality of delay times (sample points), based on the associations shown in FIG. 12.

As described above, in this exemplary arrangement, a plurality of path gains are quantized such that a plurality of path gains in a cluster including a greater delay time are quantized using a greater number of reporting bits per unit electric power of average path gain. By this means, it is possible to preferentially improve the accuracy of CSI reporting in a range including a greater delay time in the CSI reporting coverage, that is, a range to influence a significant channel variation in the frequency domain while keeping the amount of feedback constant. Therefore, radio communication apparatus 400 in the data transmitting side is able to preferentially suppress a significant channel variation in the frequency domain by pre-coding processing.

Moreover, according to this exemplary arrangement, it is possible to widen the coherent bandwidth of signals by suppressing a significant channel variation in the frequency domain by pre-coding processing, so that it is possible to improve coding gain using burst error correction codes. In addition, it is possible to widen the coherent bandwidth of signals, so that it is possible to easily perform localized allocation. Moreover, it is possible to reduce MCS selection error in adaptive modulation and coding processing.

Setting Example 2

With this exemplary setting, quantizing section 107 shown in FIG. 5 quantizes a plurality of path gains such that a plurality of path gains in a cluster including a smaller delay time are quantized using a greater number of reporting bits per unit electric power of average path gain.

To be more specific, as shown in FIG. 13, setting section 302 (setting section 402) sets the number of reporting bits per unit electric power of average path gain in cluster 1 to 1.2, sets the number of reporting bits per unit electric power of average path gain in cluster 2 to 1.0, and sets the number of reporting bits per unit electric power of average path gain in cluster 3 to 0.8. That is, setting section 302 (setting section 402) sets the number of reporting bits such that the number of reporting bits per unit electric power of average path gain in cluster 1 including a smaller delay time is the greatest (1.2), and the number of bits per unit electric power of average path gain in cluster 3 including a greater delay time is the smallest (0.8).

FIG. 14 is a table providing an example of associations between sample points and numbers of reporting bits in the power delay profile shown in FIG. 13. As shown in FIG. 14, in cluster 1 in which the number of reporting bits per unit electric power of average path gain is 1.2, setting section 302 (setting section 402) sets the number of reporting bits at the sample point of sample number 1 to sixteen and sets the number of reporting bits at the sample point of sample number 2 to fifteen. The same applies to sample numbers 3 to 5. In addition, as shown in FIG. 14, the same applies to cluster 2 (sample numbers 6 to 10) and cluster 3 (sample numbers 11 to 15).

Therefore, as shown in FIG. 14, quantizing section 107 quantizes the path gain at the sample point of sample number 1 with 16 bits and quantizes the path gain at the sample point of sample number 2 with 15 bits. The same applies to sample numbers 3 to 15. Therefore, as shown in FIG. 14, the generated CSI includes a bit sequence of 120 bits in the same way as in Embodiment 1 (FIG. 4).

Likewise, dequantizing section 203 in radio communication apparatus 400 (FIG. 6) in the data transmitting side dequantizes CSI (bit streams indicating a plurality of path gains) inputted from extracting section 201 with numbers of reporting bits respectively associated with a plurality of delay times (sample points), based on the associations shown in FIG. 14.

As described above, with this exemplary arrangement, a plurality of path gains are quantized such that path gains in a cluster including a smaller delay time are quantized with a greater number of reporting bits per unit electric power of average path gain. By this means, it is possible to preferentially improve the accuracy of CSI reporting in a range including a smaller delay time in the CSI reporting coverage, that is, a range to influence a moderate channel variation in the frequency domain while keeping the amount of feedback constant. Therefore, radio communication apparatus 400 in the data transmitting side is able to preferentially suppress moderate channel variation in the frequency domain by pre-coding processing.

Moreover, according to this exemplary arrangement, it is possible to narrow the coherent bandwidth of signals by suppressing moderate channel variation in the frequency domain by pre-coding processing, so that it is possible to improve coding gain using random error correction codes. Furthermore, it is possible to narrow the coherent bandwidth of signals, so that it is possible to increasingly improve the effect of averaging transmission data (frequency diversity effect) by a transmission method of spreading transmission data in the frequency domain (e.g. MC-CDMA).

Exemplary arrangements 1 and 2 according to the present embodiment have been described.

Thus, according to the present embodiment, the number of reporting bits per unit electric power of average path gain is set in accordance with the magnitude of delay time in a plurality of clusters. By this means, it is possible to set the accuracy of CSI reporting per cluster more finely while keeping the number of CSI reporting bits constant. To be more specific, at the time of suppressing significant channel variation in the frequency domain, the reporting accuracy in a cluster including a greater delay time may be increased (the number of reporting bits per unit electric power is increased), and, on the other hand, at the time of suppressing moderate channel variation in the frequency domain, the reporting accuracy in a cluster including a smaller delay time is increased. Therefore, according to the present embodiment, it is possible to improve the accuracy of CSI reporting depending on channel variations.

Embodiment 4

The present embodiment is the same as Embodiment 2 in that a CSI reporting coverage in the range of delay times is divided into a range within a GI and a range beyond the GI, but is different from Embodiment 2 in that a range beyond the GI is further divided into a plurality of clusters.

Now, the present embodiment will be described in detail. In the following descriptions, in power delay profiles shown in FIG. 15 and FIG. 17, respectively, average path gain monotonically decreases with an increase in delay times in the same way as in Embodiment 2 (FIG. 7).

Figure 15:
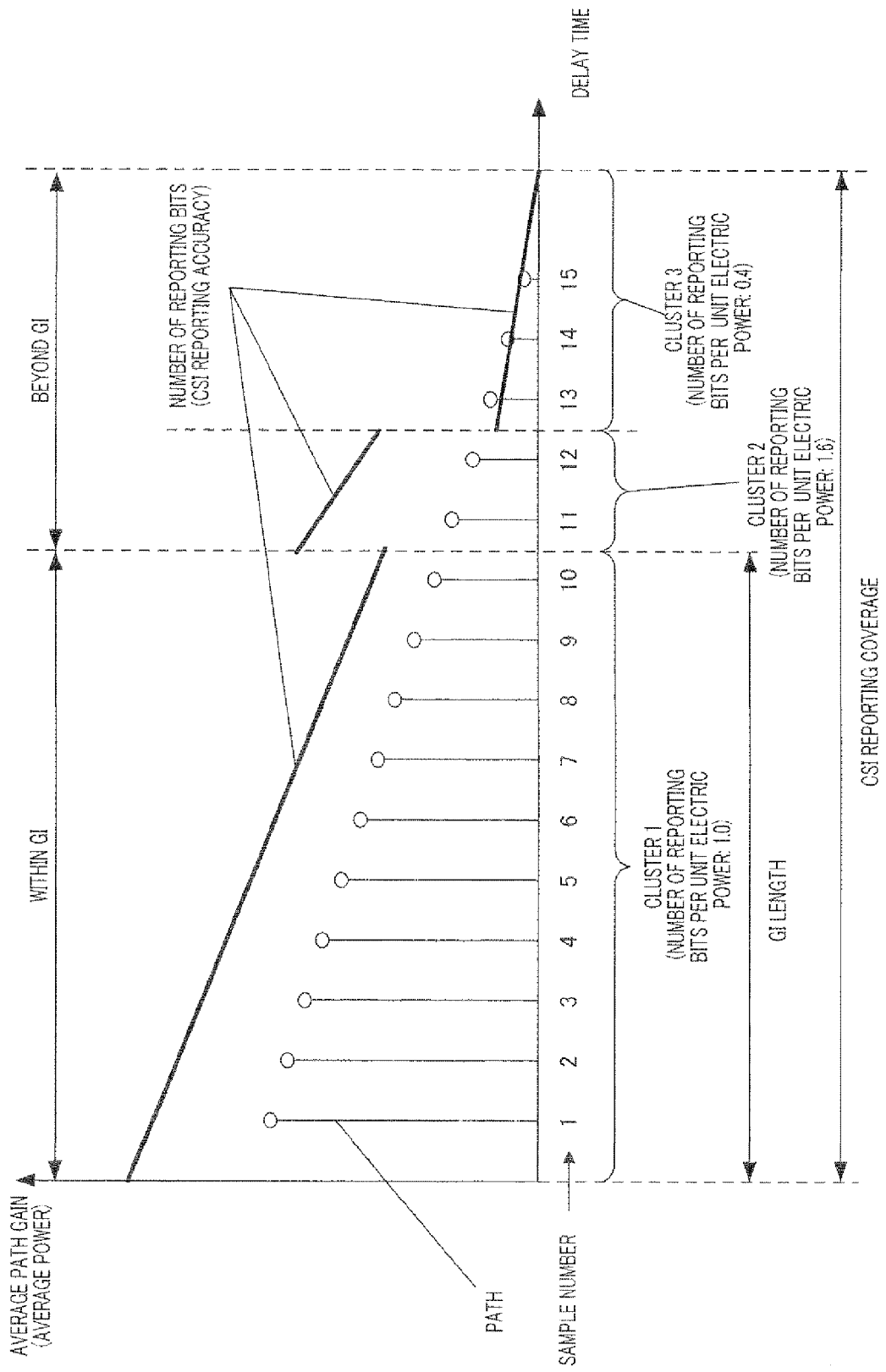
FIG. 15 is a drawing showing the number of reporting bits per delay time according to Embodiment 4 of the present invention.
Figure 17:
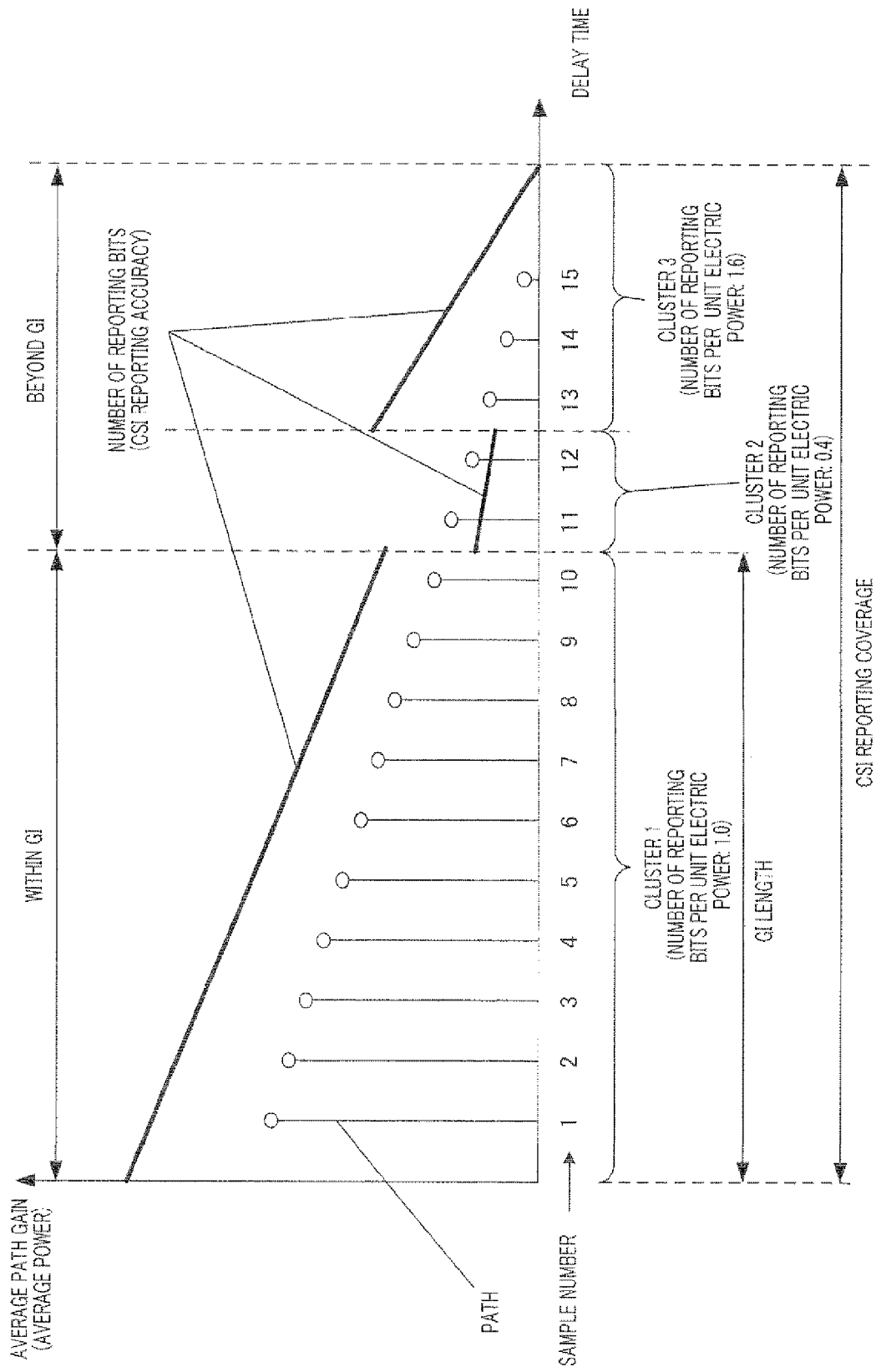
FIG. 17 is a drawing showing the number of reporting bits per delay time according to Embodiment 4 of the present invention.

In addition, in dividing section 301 shown in FIG. 5 (dividing section 402 shown in FIG. 6), the CSI reporting coverage (sample points of sample numbers 1 to 15) is divided into three clusters (clusters 1 to 3 shown in FIG. 15 and FIG. 17). Here, dividing section 301 (dividing section 401) sets the break point in a CSI reporting range at the end of a GI length. Therefore, as shown in FIG. 15 and FIG. 17, cluster 1 is composed of the sample points of sample numbers 1 to 10, that is, sample points included within the GI range. Moreover, cluster 2 is composed of the sample points of sample numbers 11 and 12 and cluster 3 is composed of the sample points of sample numbers 13 to 15, among the samples of sample numbers 11 to 15 included in the range beyond the GI.

Figure 16:
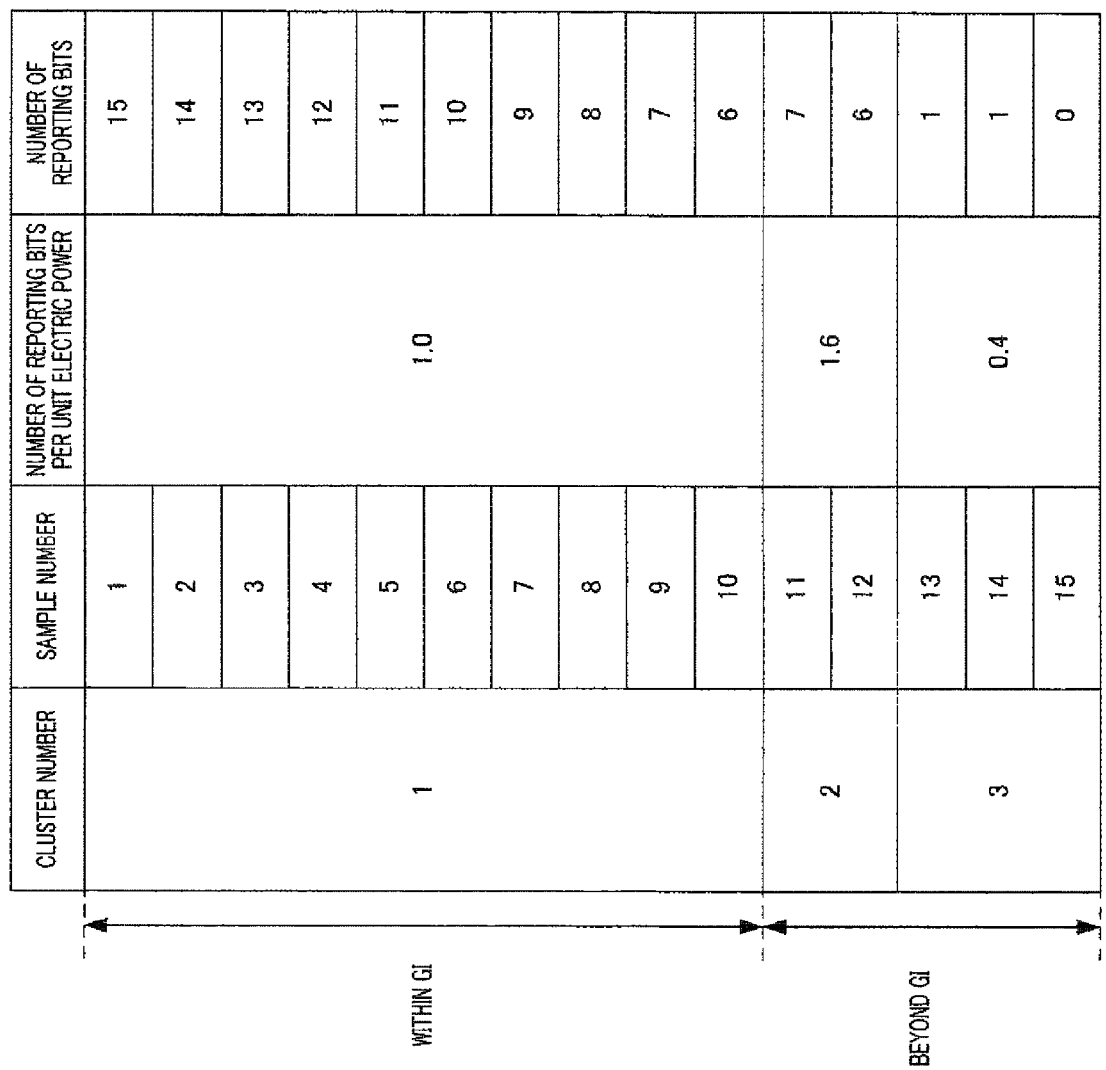
FIG. 16 is a table showing the number of reporting bits of CSI according to Embodiment 4 of the present invention.
Figure 18:
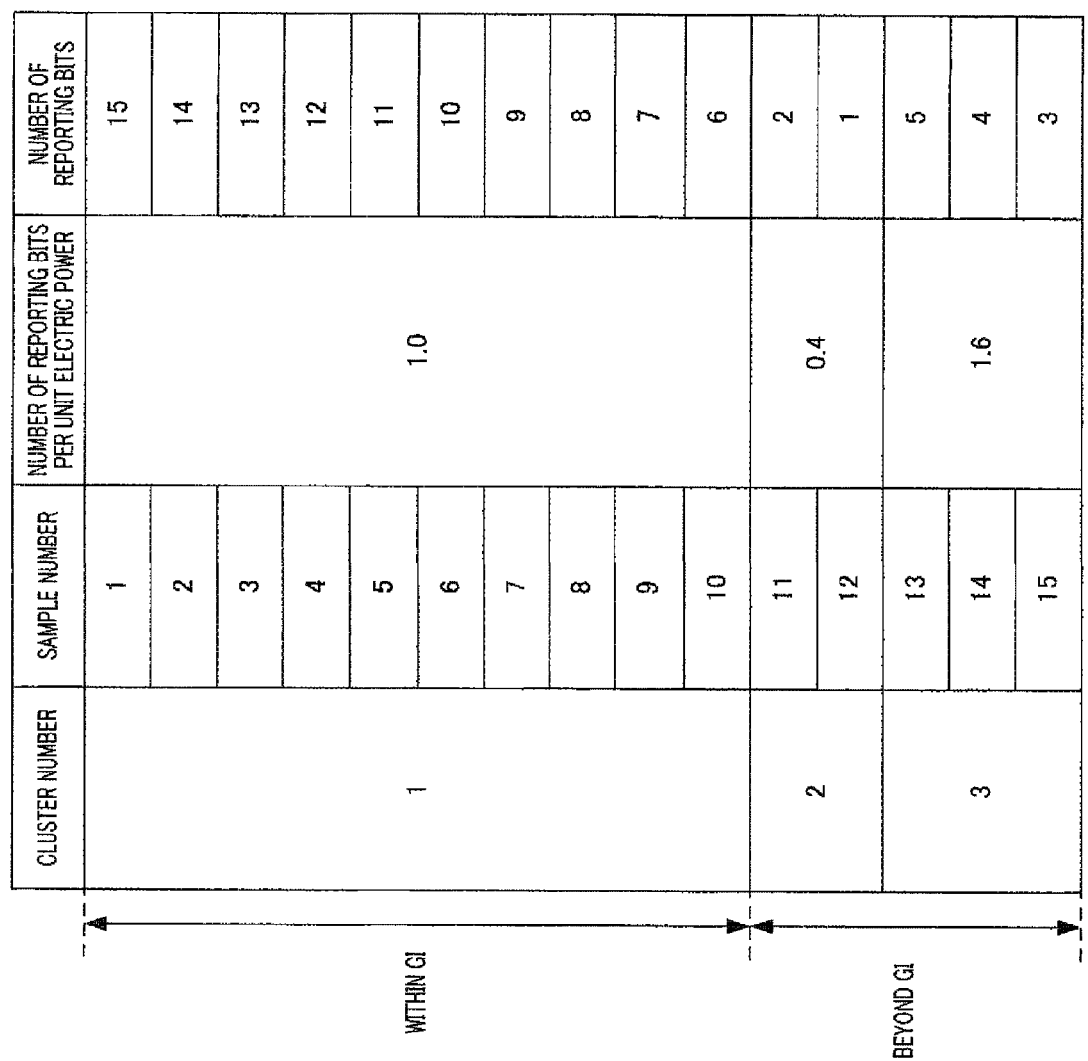
FIG. 18 is a table showing the number of reporting bits of CSI according to Embodiment 4 of the present invention.

In addition, the number of reporting bits at each sample point shown in FIG. 16 and FIG. 18 is calculated by multiplying the number of reporting bits per unit electric power of average path gain in each cluster and the average path gain at each sample point, in the same way as in Embodiment 2. Here, if the number of reporting bits at each sample point is not an integer, round-up or round-down may be possible. In addition, the number of reporting bits at each sample is adjusted such that the total number of reporting bits at all the sample points of sample numbers 1 to 15 is 120.

Setting Example 1

With this setting example, quantizing section 107 shown in FIG. 5 quantizes a plurality of path gains such that path gains in a cluster including a smaller delay time, among a plurality of clusters divided by dividing section 301 (dividing section 401) in the range beyond the GI, using a greater number of reporting bits per unit electric power of average path gain.

To be more specific, as shown in FIG. 15, setting section 302 (setting section 402) sets the number of reporting bits per unit electric power of average path gain in cluster 1 to 1.0, sets the number of reporting bits per unit electric power of average path gain in cluster 2 to 1.6, and sets the number of reporting bits per unit electric power of average path gain in cluster 3 to 0.4. That is, setting section 302 (setting section 402) sets the number of reporting bits such that the number (1.6) of reporting bits per unit electric power of average path gain in cluster 2 including a smaller delay time is greater than the number (0.4) of reporting bits per unit electric power of average path gain in cluster 3 including a greater delay time, in the range including delay times beyond the GI.

FIG. 16 is a table showing associations between sample points and numbers of reporting bits in the power delay profile shown in FIG. 15. As shown in FIG. 16, in cluster 1 in which the number of reporting bits per unit electric power of average path gain is 1.0, setting section 302 (setting section 402) sets the number of reporting bits at the sample point of sample number 1 to fifteen and sets the number of reporting bits at the sample point of sample number 2 to fourteen. The same applies to sample numbers 3 to 10. Likewise, as shown in FIG. 16, in cluster 2 in which the number of reporting bits per unit electric power of average path gain is 1.6, setting section 302 (setting section 402) sets the number of reporting bits at the sample point of sample number 11 to seven and sets the number of reporting bits at the sample point of sample number 12 to six. In addition, as shown in FIG. 16, in cluster 3 in which the number of reporting bits per unit electric power of average path gain is 0.4, setting section 302 (setting section 402) sets the number of reporting bits at the sample point of sample number 13 to one, sets the number of reporting bits at the sample point of sample number 14 to one, and sets the number of reporting bits at the sample point of sample number 15 to zero.

Therefore, as shown in FIG. 16, quantizing section 107 quantizes the path gain at the sample point of sample number 11 with 7 bits, and quantizes the path gain at the sample point of sample number 12 with 6 bits in cluster 2. Meanwhile, quantizing section 107 quantizes the path gain at the sample point of sample number 13 with 1 bit, and quantizes the path gain at the sample point of sample number 14 with 1 bit in cluster 3. Here, the sample point of sample number 15 is not quantized because the number of reporting bits is zero. Therefore, as shown in FIG. 16, the generated CSI includes a bit sequence of 120 bits in the same way as in Embodiment 1 (FIG. 4).

Likewise, dequantizing section 203 in radio communication apparatus 400 (FIG. 6) in the data transmitting side dequantizes CSI (bit streams indicating a plurality of path gains) inputted from extracting section 201 with numbers of reporting bits respectively associated with a plurality of delay times (sample points), based on the associations shown in FIG. 16.

As described above, with this exemplary arrangement, in the range including delay times beyond a GI, a plurality of path gains are quantized such that path gains in a cluster including a smaller delay time are quantized with a greater number of reporting bits per unit electric power of average path gain. By this means, in the range beyond a GI in the CSI reporting coverage, it is possible to preferentially improve the accuracy of CSI reporting in the range including a smaller delay time, that is, the range to influence moderate channel variation in the frequency domain while keeping the amount of feedback constant. Therefore, in channel variation in the range in which a GI cannot prevent interference, radio communication apparatus 400 in the data transmitting side is able to preferentially suppress moderate channel variation in the frequency domain by pre-coding processing. In addition, it is possible to narrow the coherent bandwidth of interference by suppressing moderate channel variation in the frequency domain, so that it is possible to improve coding gain using random error correction codes. Moreover, it is possible to narrow the coherent bandwidth of interference, so that it is possible to increasingly improve the effect of suppressing interference by a method of spreading transmission data in the frequency domain (e.g. MC-CDMA).

Setting Example 2

With this setting example, quantizing section 107 shown in FIG. 5 quantizes a plurality of path gains in a plurality of clusters divided by dividing section 301 (dividing section 401) in the range beyond the GI such that path gains in a cluster including a greater delay time are quantized using a greater number of reporting bits per unit electric power of average path gain.

To be more specific, as shown in FIG. 17, setting section 302 (setting section 402) sets, for example, the number of reporting bits per unit electric power of average path gain in cluster 1 to 1.0, sets the number of reporting bits per unit electric power of average path gain in cluster 2 to 0.4, and sets the number of reporting bits per unit electric power of average path gain in cluster 3 to 1.6. That is, setting section 302 (setting section 402) sets the number of reporting bits such that the number (1.6) of reporting bits per unit electric power in cluster 3 including a greater delay time is greater than the number (0.4) of reporting bits per unit electric power of average path gain in cluster 2 including a smaller delay time, in the range including delay times beyond the GI.

FIG. 18 is a table providing an example of associations between sample points and numbers of reporting bits in the power delay profile shown in FIG. 17. As shown in FIG. 18, the number of reporting bits in cluster 1 (sample numbers 1 to 10) is the same as in setting example 1 (FIG. 16). In addition, as shown in FIG. 18, in cluster 2 in which the number of reporting bits per unit electric power of average path gain is 0.4, setting section 302 (setting section 402) sets the number of reporting bits at the sample point of sample number 11 to two, and sets the number of reporting bits at the sample point of sample number 12 to one. Moreover, as shown in FIG. 18, in cluster 3 in which the number of reporting bits per unit electric power of average path gain is 1.6, setting section 302 (setting section 402) sets the number of reporting bits at the sample point of sample number 13 to five, sets the number of reporting bits at the sample point of sample number 14 to four, and sets the number of reporting bits at the sample point of sample number 15 to three.

Therefore, as shown in FIG. 18, quantizing section 107 quantizes the path gain at the sample point of sample number 11 with 2 bits, and quantizes the path gain at the sample point of sample number 12 with 1 bit in cluster 2. Meanwhile, quantizing section 107 quantizes the path gain at the sample point of sample number 13 with 5 bits, quantizes the path gain at the sample point of sample number 14 with 4 bits and quantizes the path gain at the sample point of sample number 15 with 3 bits in cluster 3. Therefore, as shown in FIG. 18, the generated CSI includes a bit sequence of 120 bits in the same way as in Embodiment 1 (FIG. 4).

Likewise, dequantizing section 203 in radio communication apparatus 400 (FIG. 6) in the data transmitting side dequantizes CSI (bit streams indicating a plurality of path gains) inputted from extracting section 201 with numbers of reporting bits respectively associated with a plurality of delay times (sample points), based on the associations shown in FIG. 18.

As described above, with this exemplary arrangement, in the range including delay times beyond a GI, a plurality of path gains are quantized such that path gains in a cluster including a greater delay time are quantized with a greater number of reporting bits per unit electric power of average path gain. By this means, in a range beyond a GI in the CSI reporting coverage, it is possible to preferentially improve the accuracy of CSI reporting in a range including a greater delay time, that is, a range to influence significant channel variation in the frequency domain while keeping the amount of feedback constant. Therefore, in channel variations in the range in which a GI cannot prevent interference, radio communication apparatus 400 in the data transmitting side is able to preferentially suppress significant channel variation in the frequency domain by pre-coding processing. In addition, it is possible to widen the coherent bandwidth of interference by suppressing significant channel variation in the frequency domain, so that it is possible to improve coding gain using burst error correction codes. In addition, it is possible to widen the coherent bandwidth of interference, so that it is possible to easily perform localized allocation. Moreover, it is possible to reduce MCS selection error in adaptive modulation and coding processing.

Setting examples 1 and 2 according to the present embodiment have been described.

As described above, with the present embodiment, the range beyond a GI is further divided into a plurality of clusters. By this means, it is possible to set CSI for delay times beyond a GI more finely. To be more specific, in channel variations in the range in which a GI cannot prevent interference, at the time of suppressing significant channel variation in the frequency domain, the reporting accuracy in a cluster including a greater delay time may be increased, and, on the other hand, at the time of suppressing moderate channel variation in the frequency domain, the reporting accuracy in a cluster including a smaller delay time may be increased. Therefore, according to the present embodiment, it is possible to increasingly improve the accuracy of CSI reporting in delay times beyond a GI without overload of the feedback channel.

Each embodiment of the present invention has been described.

Figure 19:
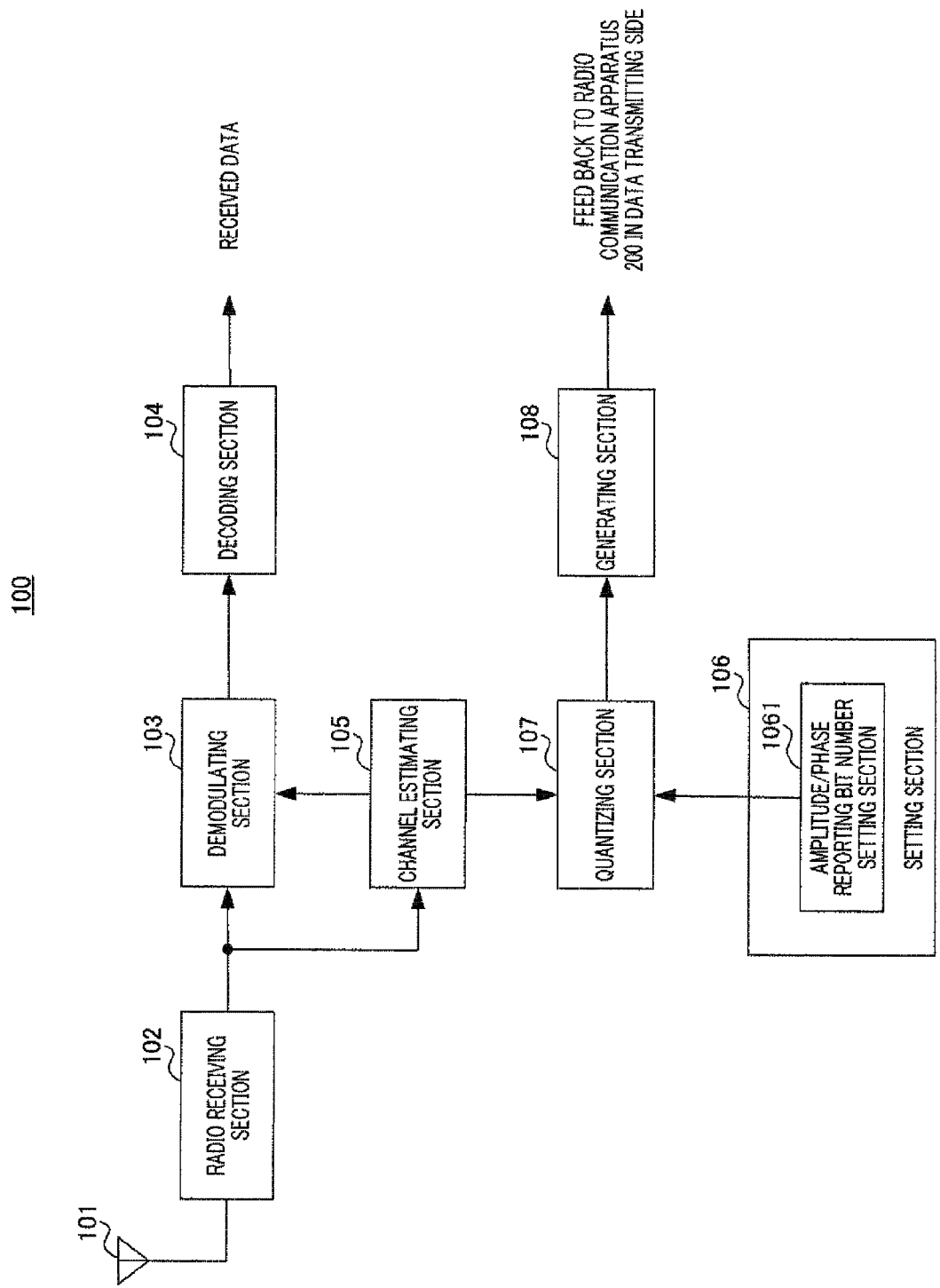
FIG. 19 is a block diagram showing a configuration of another radio communication apparatus in the data receiving side according to the present invention.

Here, quantizing section 107 (FIG. 1 and FIG. 5) may quantize the amplitude and the phase of the path gain of a CIR inputted from channel estimating section 105. FIG. 19 shows the configuration of radio communication apparatus 100 in the data receiving side in this case. Setting section 106 in radio communication apparatus 100 in the data receiving side shown in FIG. 19 includes inside amplitude/phase reporting bit number setting section 1061. Amplitude/phase reporting bit number setting section 1061 sets numbers of reporting bits respectively associated with a plurality of delay times, by dividing into numbers of bits for amplitudes of path gains and numbers of bits for phases of path gains. For example, at the sample point of sample number 1, amplitude/phase reporting bit number setting section 1061 sets the number of bits for the amplitude to eight among 15 reporting bits and sets the number of bits for the phase to the remaining seven of the 15 bits. Here, in amplitude/phase setting bit number setting section 1061, numbers of reporting bits may be divided into numbers of reporting bits for amplitudes and numbers of reporting bits for phases in equal proportions or in unequal proportion to improve the reporting accuracy of either one.

Figure 20:
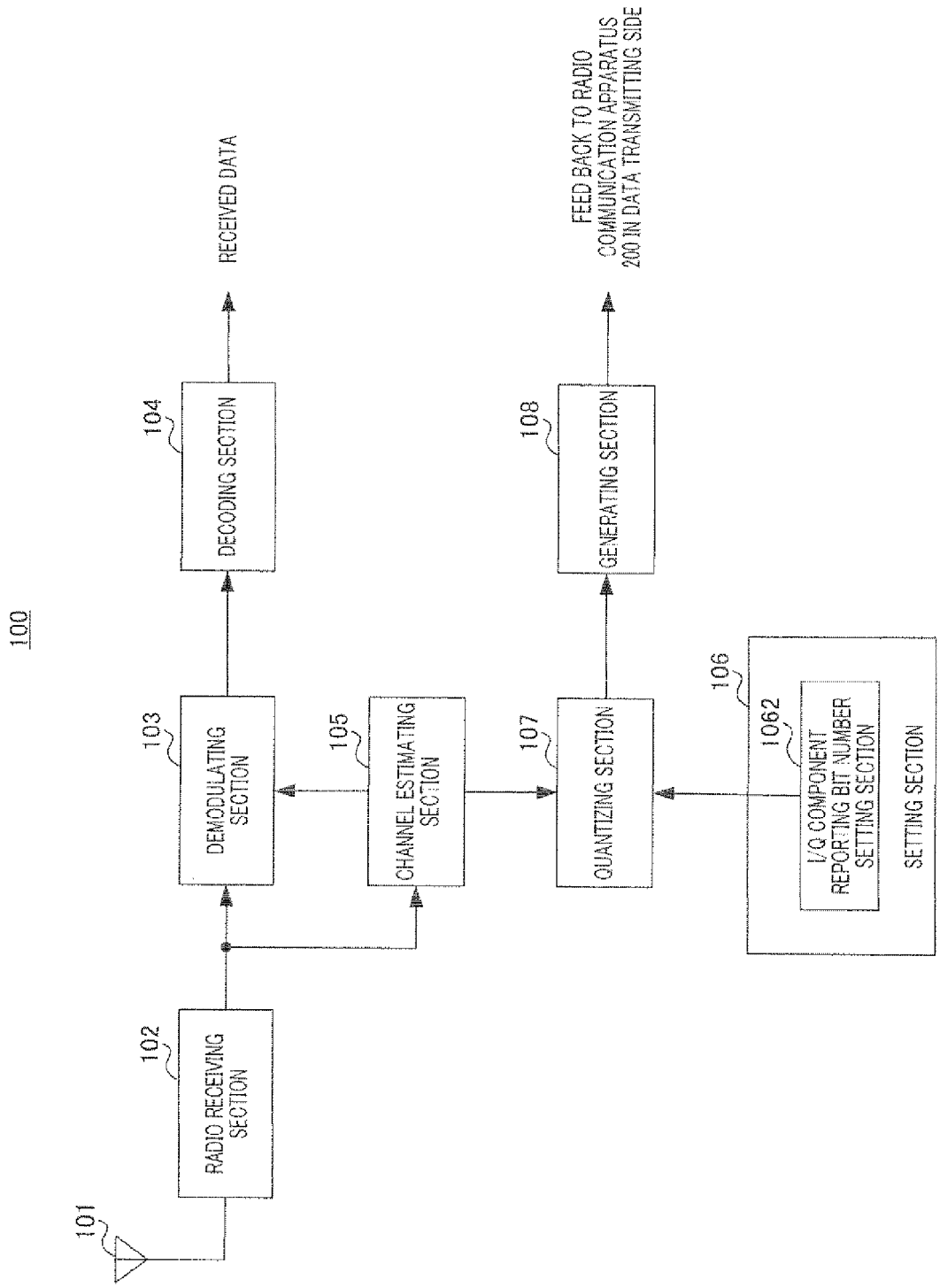
FIG. 20 is a block diagram showing a configuration of another radio communication apparatus in the data receiving side according to the present invention.

In addition, in the above-described embodiments, quantizing section 107 (FIG. 1) may quantize the in phase (I) component and the quadrature (Q) component of each path gain of a CIR inputted from channel estimating section 105. FIG. 20 shows the configuration of radio communication apparatus 100 in the data receiving side in this case. Setting section 106 in radio communication apparatus 100 in the data receiving side shown in FIG. 20 includes inside I/Q component reporting bit setting section 1062. I/Q component reporting bit number setting section 1062 sets numbers of reporting bits respectively associated with a plurality of relay times, by dividing into numbers of bits for the in phase component (I component) and numbers of bits for the quadrature component (Q component) of a path gain. For example, at the sample point of sample number 1 shown in FIG. 4, I/Q component reporting bit number setting section 1062 sets the number of bits for the in phase component (I component) to eight, among 15 reporting bits, and sets the number of bits for the quadrature component (Q component) to the remaining seven of the 15 bits. Here, in I/Q component reporting bit number setting section 1062, numbers of reporting bits may be divided into numbers of bits for the in phase component (I component) and numbers of bits for the quadrature component (Q component) in equal proportions or in unequal proportion to improve the reporting accuracy of either one.

In addition, with the above-described embodiments, a case has been described where the number of CSI reporting bits is set based on delay time. However, the present embodiment is not limited to the number of CSI reporting bits, and the dynamic range for each delay time (sample point) may be set based on the delay time.

In addition, in the above-described embodiment, the number of CSI reporting bits at each delay time (sample point), the number of reporting bits per unit electric power of average path gain in each cluster, the number of clusters (the division number of a CSI reporting coverage), the dimension of each cluster (cluster size) and CSI reporting intervals may be adaptively changed in the time domain. By this means, it is possible to allow high-efficient adaptive modulation and coding following change in time in the propagation environment with a minimum amount of feedback.

Moreover, in the above-described embodiments, the number of CSI reporting bits at each delay time (sample point), the number of reporting bits per unit electric power of average path gain in each cluster, the number of clusters (the division number of a CSI reporting coverage), the dimension of each cluster (cluster size) and CSI reporting intervals may be changed per UE. The above-described parameters may be changed depending on the positions of UEs, for example, the UE about the center of a cell and the UE near an edge of a cell. By this means, it is possible to allow the optimum adaptive modulation and coding for each UE with the minimal amount of feedback.

Moreover, in the above-described embodiments, a case has been described where a plurality of delay times (sample points) are set at even intervals. However, the present invention is not limited to the case in which a plurality of delay times (sample points) are set at even intervals, and intervals may be changed according to delay times (sample points). For example, as shown in FIG. 21, the sample interval in cluster 1 is set to 2 and the sample interval in cluster 2 and cluster 3 is set to 0.6. Here, the number of reporting bits at each sample point is eight. That is, the total number of CSI reporting bits is 120 in the same way as in the above-described embodiments. To be more specific, as shown in FIG. 21, cluster 1 is composed of sample points of sample numbers 1, 3, 5, 7 and 9, cluster 2 is composed of sample points of sample numbers 9, 6, 10.2, 10.8, 11.4 and 12, and cluster 3 is composed of sample points of sample numbers 12.6, 13.2, 13.8, 14.4 and 15. That is, as shown in FIG. 21, among sample numbers 1 to 15, sample intervals are increased in the range including a smaller delay time (here, cluster 1), and, on the other hand, sample intervals are reduced in the range including a greater delay time (here, clusters 2 and 3). Therefore, the number of reporting bits is set such that the number of reporting bits in the range including a greater delay time (here, cluster 2 and cluster 3) is greater than the number of reporting bits in the range including a smaller delay time (here, cluster 1). That is, a cluster in which delay time intervals are narrower is reported a greater amount of CSI, and consequently, is equivalent to a cluster for which a greater number of reporting bits per unit electric power of average path gain is set. By this means, it is possible to produce the same effect as in the above-described embodiments.

Figure 22:
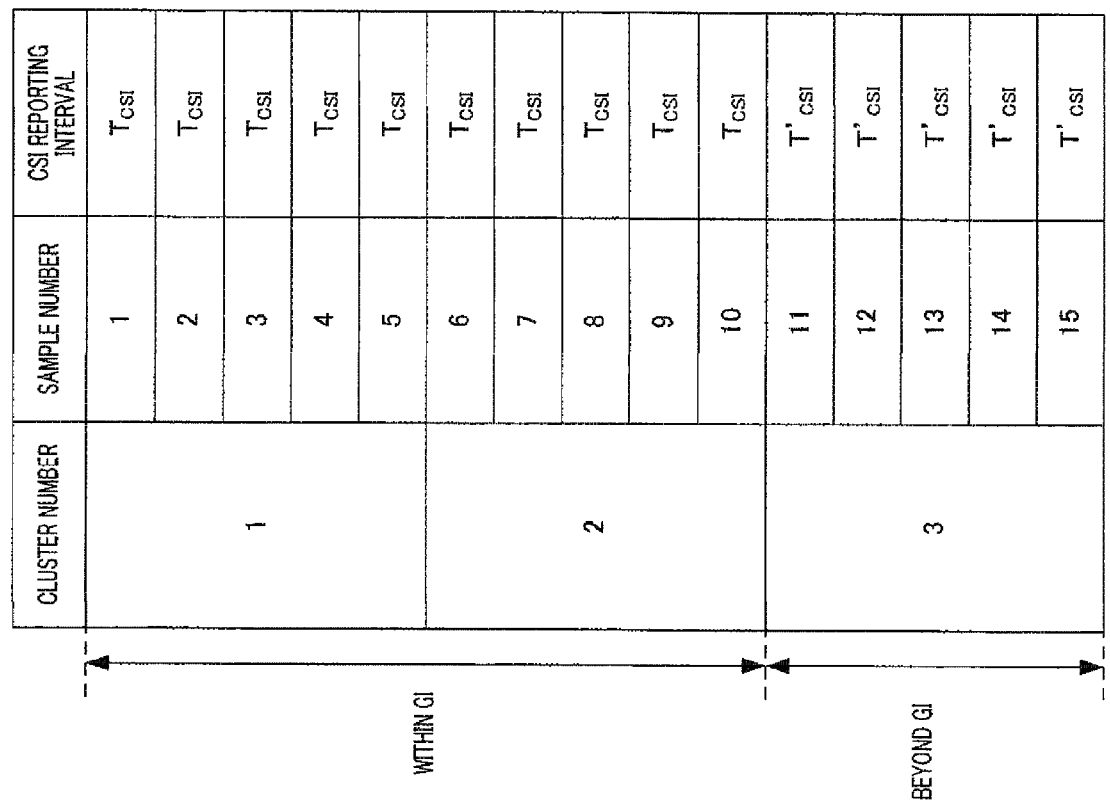
FIG. 22 is a table showing the number of CSI reporting bits at different intervals according to the present invention.

In addition, with the present embodiment, CSI reporting intervals may be changed per delay time (sample point) or per cluster. Now, a case will be described as an example where CSI reporting intervals are changed per cluster. As shown in FIG. 22, the CSI reporting interval in cluster 1 (sample numbers 1 to 5) and cluster 2 (sample numbers 6 to 10) each including delay times within a GI may be $T_{CSI}$, and the CSI reporting interval in cluster 3 (sample numbers 11 to 15) including delay times beyond the GI may be $T'_{CSI}$. For example, when the total gain (total power) of paths in the range beyond the GI is greater than a predetermined threshold, CSI reporting interval T'$_{CSI}$ in cluster 3 is shorter than T'$_{CSI}$ in order to improve the accuracy of CSI reporting for paths in the range beyond the GI. That is, T$_{CSI}$>T'$_{CSI}$. On the other hand, when the total gain (total power) of paths in the range beyond the GI is equal to or lower than a predetermined threshold, CSI reporting interval T'$_{CSI}$ in cluster 3 is longer than T$_{CSI}$ because paths in the range beyond the GI have little influence on channel variation in the frequency domain. That is, T$_{CSI}$<T'$_{CSI}$. By this means, CSI in the range including delay times beyond the GI is frequently reported when necessary, and are reported at long intervals when unnecessary. By this means, it is possible to minimally reduce the number of CSI reporting bits, so that it is possible to increasingly reduce the amount of feedback in the feedback channel.

Figure 23:
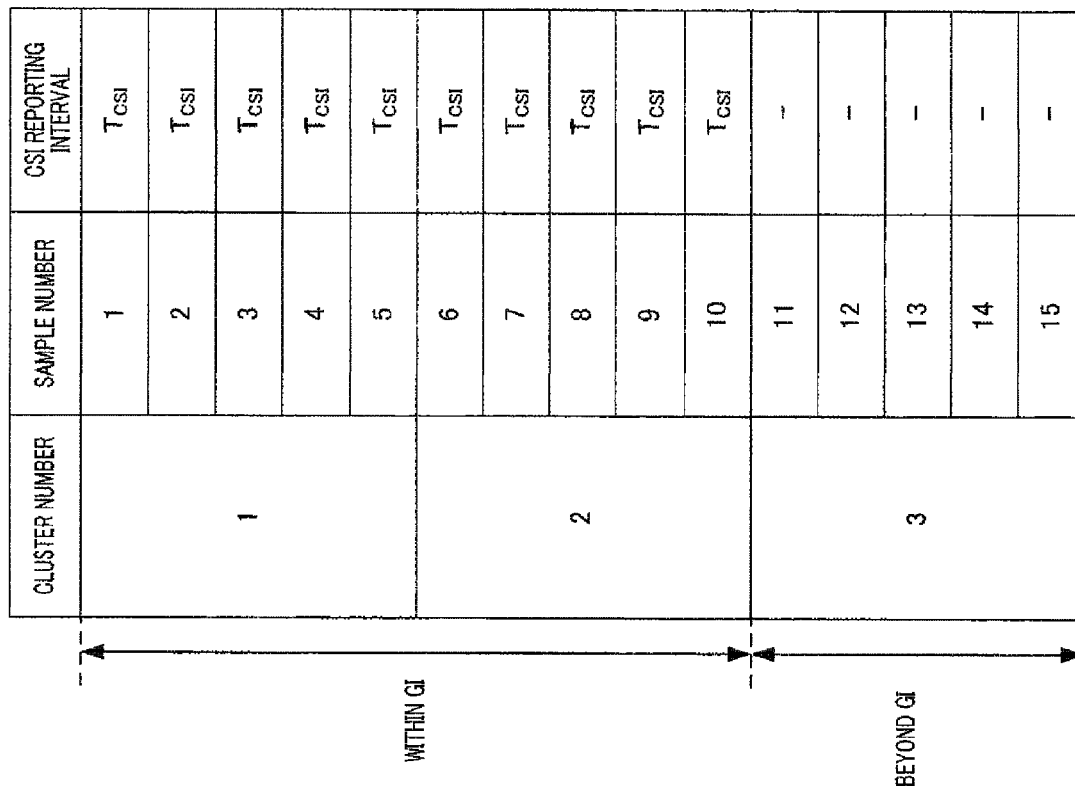
FIG. 23 is a table showing the number of CSI reporting bits at different intervals according to the present invention.

Moreover, for example, as shown in FIG. 23, CSI in cluster 3 (sample numbers 11 to 15) including delay times beyond the GI may be reported on an irregular basis. To be more specific, only when paths are detected in the range beyond the GI, or only when the total gain (total power) in the range beyond the GI is greater than a predetermine threshold, CSI in cluster 3 is reported. By this means, CSI in the range including delay times beyond the GI is reported only when necessary, so that it is possible to increasingly reduce the amount of feedback in the feedback channel.

In addition, with the above-described embodiments, a case has been described where the number of reporting bits according to average path gain is set for all delay times (sample points) in a CSI reporting coverage. However, according to the present invention, for example, the number of reporting bits in specific delay times (sample points or cluster) may be fixed, and the number of reporting bits in delay times other than the specific delay times may be set in the same way as in the above-described embodiments. For example, as shown in FIG. 24, the number of reporting bits in cluster 2 (sample numbers 6 to 10) is fixed to eight, and the number of reporting bits in cluster 1 (sample numbers 1 to 5) and cluster 3 (sample numbers 11 to 15) are set in the same way as in the above-described embodiments. Likewise, for example, as shown in FIG. 25, the number of reporting bits in cluster 3 (sample numbers 11 to 15) is fixed to two, and the number of reporting bits in cluster 1 (sample numbers 1 to 5) and cluster 2 (sample numbers 6 to 10) are set in the same way as in the above-described embodiments. By this means, a desired number of reporting bits are set preferentially for specific delay times (cluster), and, on that basis, it is possible to feed back CSI of all paths while keeping the amount of feedback constant.

The radio communication apparatus in the data receiving side and the radio communication apparatus in the data transmitting side are applicable to a radio communication mobile station apparatus or a radio communication base station apparatus used in a mobile communication system and so forth. The radio communication apparatus in the data receiving side and the radio communication apparatus in the data transmitting side are mounted in a radio communication mobile station apparatus or a radio communication base station apparatus, so that it is possible to provide a radio communication mobile station apparatus and a radio communication base station apparatus having the same operations and effects as in the above descriptions. Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-115664, filed on Apr. 25, 2008, including the specification, drawings and abstract, is incorporated herein by reference in its entirety.

INDUSTRIAL APPLICABILITY

The present invention is applicable to a mobile communication system and so forth.

The invention claimed is:
1. A radio communication apparatus comprising:
an estimating section that performs channel estimation to obtain a plurality of path gains at each of plurality of delay times;
a quantizing section that quantizes the plurality of path gains with numbers of quantization bits respectively associated with the plurality of delay times, wherein the numbers of quantization bits being obtained by multiplying an average path gain at the plurality of delay times by a number of quantization bits per unit electric power of average path gain set for each of the plurality of ranges; and
a dividing section that divides the plurality of delay times into a plurality of ranges.
2. The radio communication apparatus according to claim 1,
wherein the dividing section divides the plurality of delay times into a range within a guard interval and a range beyond the guard interval.
3. The radio communication apparatus according to claim 1,
wherein the quantizing section quantizes the plurality of path gains such that path gains in a range including a greater delay time are quantized using a greater number of quantization bits per unit electric power.
4. The radio communication apparatus according to claim 1,
wherein the quantizing section quantizes the plurality of path gains such that path gains in a range including a smaller delay time are quantized using a greater number of quantization bits per unit electric power.
5. The radio communication apparatus according to claim 1,
wherein the quantizing section quantizes an amplitude and a phase of each of the plurality of path gains.
6. The radio communication apparatus according to claim 1,
wherein the quantizing section quantizes an in phase component and a quadrature component of each of the plurality of path gains.

* * * * *